US011195360B1

(12) United States Patent
Laranang et al.

(10) Patent No.: US 11,195,360 B1
(45) Date of Patent: Dec. 7, 2021

(54) STUDENT ACCOUNTABILITY SYSTEM

(71) Applicant: Secured Mobility, LLC, Georgetown, TX (US)

(72) Inventors: Michael Laranang, Georgetown, TX (US); Brett Christian Taylor, Georgetown, TX (US); Ricardo Sevilla Lopez, Georgetown, TX (US); Emmanuel Enrique Lopez, Georgetown, TX (US)

(73) Assignee: Secured Mobility, LLC, Georgetown, TX (US)

( * ) Notice: Subject to any disclaimer, the term of this patent is extended or adjusted under 35 U.S.C. 154(b) by 0 days.

(21) Appl. No.: 16/657,392

(22) Filed: Oct. 18, 2019

Related U.S. Application Data

(63) Continuation of application No. 15/972,885, filed on May 7, 2018, now Pat. No. 10,452,878, which is a
(Continued)

(51) Int. Cl.
| | |
|---|---|
| *G07C 9/22* | (2020.01) |
| *G06Q 10/08* | (2012.01) |
| *G06K 7/10* | (2006.01) |
| *G06Q 50/30* | (2012.01) |
| *G07B 15/02* | (2011.01) |

(52) U.S. Cl.
CPC ........... *G07C 9/22* (2020.01); *G06K 7/10366* (2013.01); *G06Q 10/083* (2013.01); *G06Q 50/30* (2013.01); *G07B 15/02* (2013.01)

(58) Field of Classification Search
CPC ........ G07C 9/22; G06Q 50/30; G06Q 10/083; G07B 15/02; G06K 7/10366
See application file for complete search history.

(56) References Cited

U.S. PATENT DOCUMENTS

| | | |
|---|---|---|
| 6,006,159 A | 12/1999 | Schmier |
| 6,502,030 B2 | 12/2002 | Hilleary |
| (Continued) | | |

FOREIGN PATENT DOCUMENTS

| | | |
|---|---|---|
| EP | 0851377 A1 | 7/1998 |
| WO | WO0046772 A2 | 8/2000 |

OTHER PUBLICATIONS

A. A. Sulaiman, M. S. A. Bakar, M. Z. H. Noor and S. A. C. Abdullah, "Easy Access Attendance Management System (EAMS)," 2014 IEEE 6th Conference on Engineering Education (ICEED), Kuala Lumpur, 2014, pp. 105-110.
(Continued)

*Primary Examiner* — Nader Bolourchi
(74) *Attorney, Agent, or Firm* — Fish & Richardson P.C.

(57) ABSTRACT

Methods, systems, and apparatus, including computer programs encoded on computer storage media, for student accountability systems. School buses can be equipped with a bus system that executes a driver application. Students carry student identification (ID) systems that identify the students to the bus system, which in turn reports a geographic location to a student accountability system. The bus system is configured to permit rapid boarding and easy usage by drivers. The student accountability system provides a parent portal and an administrator portal to monitor the students and provide other useful functions.

20 Claims, 26 Drawing Sheets

Related U.S. Application Data continuation of application No. 14/744,186, filed on Jun. 19, 2015, now Pat. No. 9,977,935.

(60) Provisional application No. 62/015,226, filed on Jun. 20, 2014.

(56) References Cited

U.S. PATENT DOCUMENTS

| | | | |
|---|---|---|---|
| 6,631,841 | B2 | 10/2003 | Roberts |
| 6,736,317 | B1 * | 5/2004 | McDonald ............. G06Q 10/08 235/380 |
| 6,762,684 | B1 | 7/2004 | Camhi |
| 7,231,355 | B2 | 6/2007 | Schoen et al. |
| 8,400,296 | B2 | 3/2013 | Brinton |
| 9,330,389 | B2 | 5/2016 | Pitroda |
| 9,399,469 | B1 | 7/2016 | Harrison |
| 9,977,935 | B1 | 5/2018 | Laranang |
| 10,452,878 | B1 | 10/2019 | Laranang |
| 10,521,739 | B2 | 12/2019 | Tays et al. |
| 10,636,230 | B1 | 4/2020 | Laranang et al. |
| 10,685,521 | B1 | 6/2020 | Laranang et al. |
| 2002/0082771 | A1 | 6/2002 | Anderson |
| 2004/0111279 | A1 | 6/2004 | Schoen |
| 2005/0040224 | A1 | 2/2005 | Brinton |
| 2005/0219056 | A1 | 10/2005 | McHugh |
| 2006/0114531 | A1 | 6/2006 | Webb et al. |
| 2006/0262190 | A1 | 11/2006 | Millar |
| 2007/0024440 | A1 | 2/2007 | Moran |
| 2007/0061076 | A1 | 3/2007 | Shulman |
| 2007/0078908 | A1 | 4/2007 | Rohatgi |
| 2008/0292211 | A1 | 11/2008 | Frantz |
| 2011/0068954 | A1 | 3/2011 | McQuade |
| 2011/0098915 | A1 | 4/2011 | Disatnik |
| 2013/0108155 | A1 | 5/2013 | Mizutani |
| 2013/0127616 | A1 | 5/2013 | Robitaille |
| 2013/0190981 | A1 | 7/2013 | Dolinar |
| 2013/0229511 | A1 | 9/2013 | Oostendorp et al. |
| 2014/0114565 | A1 | 4/2014 | Aziz et al. |
| 2014/0125502 | A1 | 5/2014 | Wittkop |
| 2014/0149305 | A1 | 5/2014 | Aziz |
| 2014/0188527 | A1 | 7/2014 | Oxenham |
| 2014/0257848 | A1 | 9/2014 | Heppding |
| 2014/0313334 | A1 | 10/2014 | Slotky |
| 2015/0193994 | A1 | 7/2015 | McQuade |
| 2015/0198136 | A1 | 7/2015 | Martin |
| 2015/0235094 | A1 | 8/2015 | Kraeling |
| 2016/0018230 | A1 | 1/2016 | Neubecker |
| 2016/0350567 | A1 | 12/2016 | McQuade |
| 2016/0364645 | A1 | 12/2016 | Ulloa Paredes |
| 2016/0364699 | A1 | 12/2016 | Steketee |
| 2017/0039782 | A1 | 2/2017 | Moeller |
| 2017/0279957 | A1 | 9/2017 | Abramson et al. |
| 2017/0372143 | A1 | 12/2017 | Barcus et al. |
| 2018/0137614 | A1 | 5/2018 | Prabhu et al. |

OTHER PUBLICATIONS

T. Usagawa, Y. Nakashinna, Y. Chisaki, T. Nagai and T. Kita, "An attendance management system for Moodie using student identification card and Android device," Proceedings of International Conference on Information, Communication Technology and System (ICTS) 2014, Surabaya, 2014, pp. 199-204.

Schlosser, "Growing GPS, Student Tracking Capabilities Offer More Security Tools," School Bus Fleet, Apr./May 2015, pp. 30/32.

Truett, "Bus 54—Where Are You? a School Bus Intelligent Information System," 1998, 11 pages.

Rossetti, "Field Testing and Evaluation of the Transit Integrated Monitoring System," Aug. 13, 1998, 25 pages.

* cited by examiner

STUDENT ACCOUNTABILITY SYSTEM

CROSS-REFERENCE TO RELATED APPLICATIONS

This application is a continuation application of U.S. application Ser. No. 15/972,885, filed on May 7, 2018, which is a continuation application of U.S. application Ser. No. 14/744,186, filed on Jun. 19, 2015, now U.S. Pat. No. 9,977,935, which claims priority to U.S. Provisional Application No. 62/015,226, filed on Jun. 20, 2014, the disclosure of which are expressly incorporated herein by reference in their entirety.

BACKGROUND

This specification relates to computing systems to support students, parents, and school administrators.

Since student transportation began, school districts have been challenged with the problem of not knowing which students were on which buses. Schools and transportation departments can receive phone calls several times a week, and sometimes several times a day, from distraught parents stating that their children were not on the bus. Systems exist for tracking students as they board school buses using radio frequency identification (RFID) tags, but these system can be ineffective because they delay the boarding process and cause confusion for the bus drivers.

SUMMARY

This specification describes student accountability systems that are configured to monitor students' locations. School buses can be equipped with a bus system that executes a driver application. Students carry student identification (ID) systems that identify the students to the bus system, which in turn reports a geographic location to a student accountability system. The bus system is configured to permit rapid boarding and easy usage by drivers. The student accountability system provides a parent portal and an administrator portal to monitor the students and provide other useful functions.

One aspect of the invention features a method including presenting a student ID system to a bus system coupled to a school bus, causing the bus system to read a unique student ID from the student ID system using a first identification mode of the student ID system; and presenting the student ID system to a different school computing system, causing the different school computing system to read the unique student ID from the student ID system using a second identification mode of the student ID system.

In some embodiments, using the first identification mode involves using a near field RFID device of the student ID system, and using the second identification mode involves using an active RFID device of the student ID system. In some instances the different school computing system is a cafeteria computer system or a library computer system.

Another aspect of the invention features a method performed by a bus computing system for a bus. The method includes determining that the bus has reached a designated stop; presenting, on a display of the bus computing system, a list of students to enter or exit the bus at the designated stop; and as each student enters or exits the bus, receiving a student identifier from a student identifier system of the student, and in response, moving a name of the student associated with student identifier to a lower position in the list of students presented on the display.

In some embodiments the method also includes receiving input from a driver selecting one of the students from the list of students; presenting a photo of the selected student and a user interface element for manually boarding or exiting the student; receiving input from the driver selecting the user interface element; and adding or removing the student ID for the selected student from a roster for the bus without receiving the student ID from a student ID system.

The method may include receiving a student ID from a student ID system and determining that the student associated with the student ID is not authorized to enter or exit the bus at the current bus stop; presenting a user interface element on the display to override the lack of authorization; receiving input from the driver selecting the user interface element; and adding or removing the student ID to or from a roster for the bus.

Another aspect of the invention features bus computing system for a bus. The system is configured to perform operations including monitoring a current location of the bus; determining that the bus is at a designated stop and that a first plurality of students are assigned to exit at the designated stop; receiving a second plurality of student IDs from students exiting the bus; determining, using the monitoring of the current location of the bus, that the bus is pulling away from the designated stop and that one or more students assigned to exit at the designated stop have not exited the bus; and performing an alert action to alert the driver that the one or more students assigned to exist at the designated stop have not exited the bus.

Another aspect of the invention features a bus computing system configured to perform operations including monitoring a current location of the bus; determining, based on the current location of the bus, that the bus is beginning a second route after completing a first route; and without input from the driver, automatically loading route data for the second route.

The operations may include determining that a student from the first route is still on the bus and, in response, presenting a user interface element to a driver of the bus to allow the driver to authorize the student from the first route to continue on the second route.

Another aspect of the invention features a bus computing system configured to perform operations including receiving a route comprising a plurality of stops entered by an administrator using a mapping application; presenting a user interface element to a driver of the bus to allow the driver to indicate that the bus has reached one of the stops; determining, using a location module, that an actual location of the bus is different from the location of the stop in the route; and recording an update to the stop for the route using the actual location of the bus.

Another aspect of the invention features a case for a tablet computer system. The case has an outer section and an inner section configured to receive the tablet computer system, and the inner section has an embedded antenna assembly including a first patch in a center area of the inner section and configured to align with a near field RFID reader in the center of the tablet computer system, and a second patch in an edge area of the inner section and configured to extend the near field RFID reader to the edge of the case.

In some embodiments the first patch comprises a conductive coil inside of an enclosure.

Another aspect of the invention features a case for a tablet computer system with an outer section and an inner section configured to receive the tablet computer system, and in which the inner section comprises an antenna assembly having an embedded first patch in a center area of the inner section and configured to align with a near field RFID reader in the center of the tablet computer system, and a second patch external to the case and coupled to the first patch by a wire.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
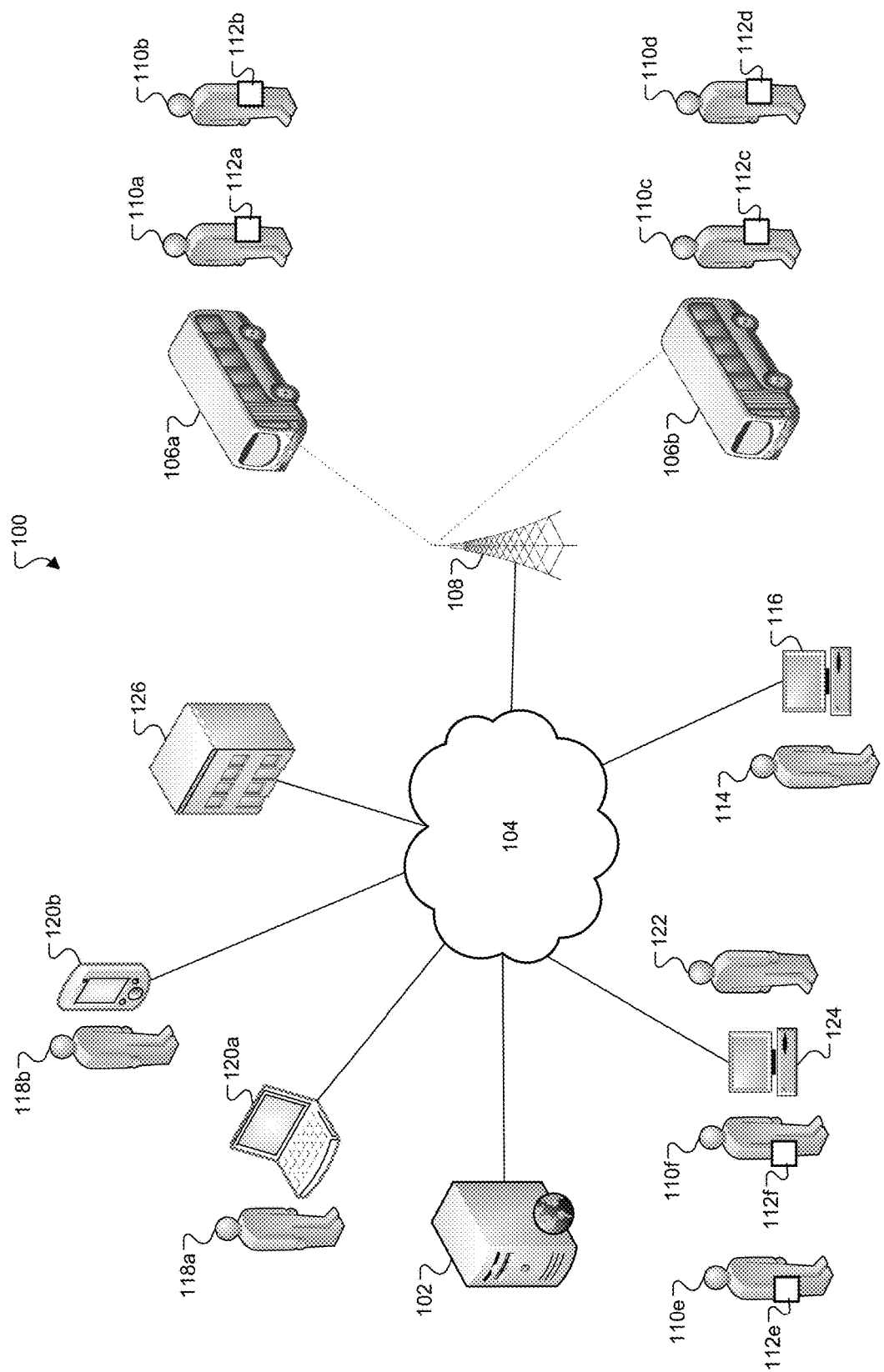
FIG. 1 is a diagram of an environment for monitoring student activities.

FIG. 1 is a diagram of an environment 100 for monitoring student activities. The environment 100 includes a student accountability system 102 which can be a server system of one or more computers configured to communicate over a data communications network 104, e.g., the Internet. FIG. 1 illustrates an overview of the environment, and other figures show components of the environment in greater detail.

The student accountability system 102 communicates over a wireless network 108, e.g., a cellular network, with bus systems 106a-b that are on school buses. Students 110a-d board the buses with student identification (ID) systems 112a-d. The bus systems 106a-b identify student IDs from the student ID systems 112a-d. The bus systems 106a-b can determine locations of the buses, e.g., using global positioning system (GPS) technology, and report location information and student status information to the student accountability system 102.

The student accountability system 102 provides an administrator portal to a school administrator 114. The school administrator 114 access the portal with a user device 116, e.g., a personal computer, tablet, or phone. Through the administrator portal, the student accountability system 102 can provide information describing where the buses are and which students are on which buses.

The student accountability system 102 provides a parent portal to parents 118a-b of the students. The parents 118a-b access the portal with user devices 120a-b, e.g., personal computers, tablets, or phones. Through the parent portal, the student accountability system 102 can provide information describing a particular student's location or the location of a particular bus that the student is riding.

The student accountability system 102 can also provide additional student services using another school system 124. The other school system 124 can be, e.g., a computer system in a cafeteria that students use to purchase food. Parents 118a-b can use the parent portal to add credits to a student's account, e.g., using a credit card or other payment system. The other school system 124 can also be, e.g., a computer system in a library that students use to check out books. The students 110e-f can use their student ID systems 112e-f to check out books and/or purchase food at the cafeteria.

The student accountability system 102 can also provide additional student services using a campus system 126. The campus system comprises one or more student ID readers positioned in or near campus areas or buildings or rooms. The student ID readers can communicate with the student accountability system 102 over the network 104, e.g., using a wireless local area network (LAN) or the cellular network 106.

The student ID readers report student IDs to the student accountability system 102 as students pass by the student ID readers carrying student ID systems. Using student ID readers positioned in doorways and walkways, the student accountability system 102 can aid parents and administrators in locating students on a campus or within buildings.

The environment in FIG. 1 is described with reference to parents, students, and school administrators. The technology described in this document can also be applied in other settings. For example, the technology can be used to track passengers or cargo in other transportation environments.

Figure 2:
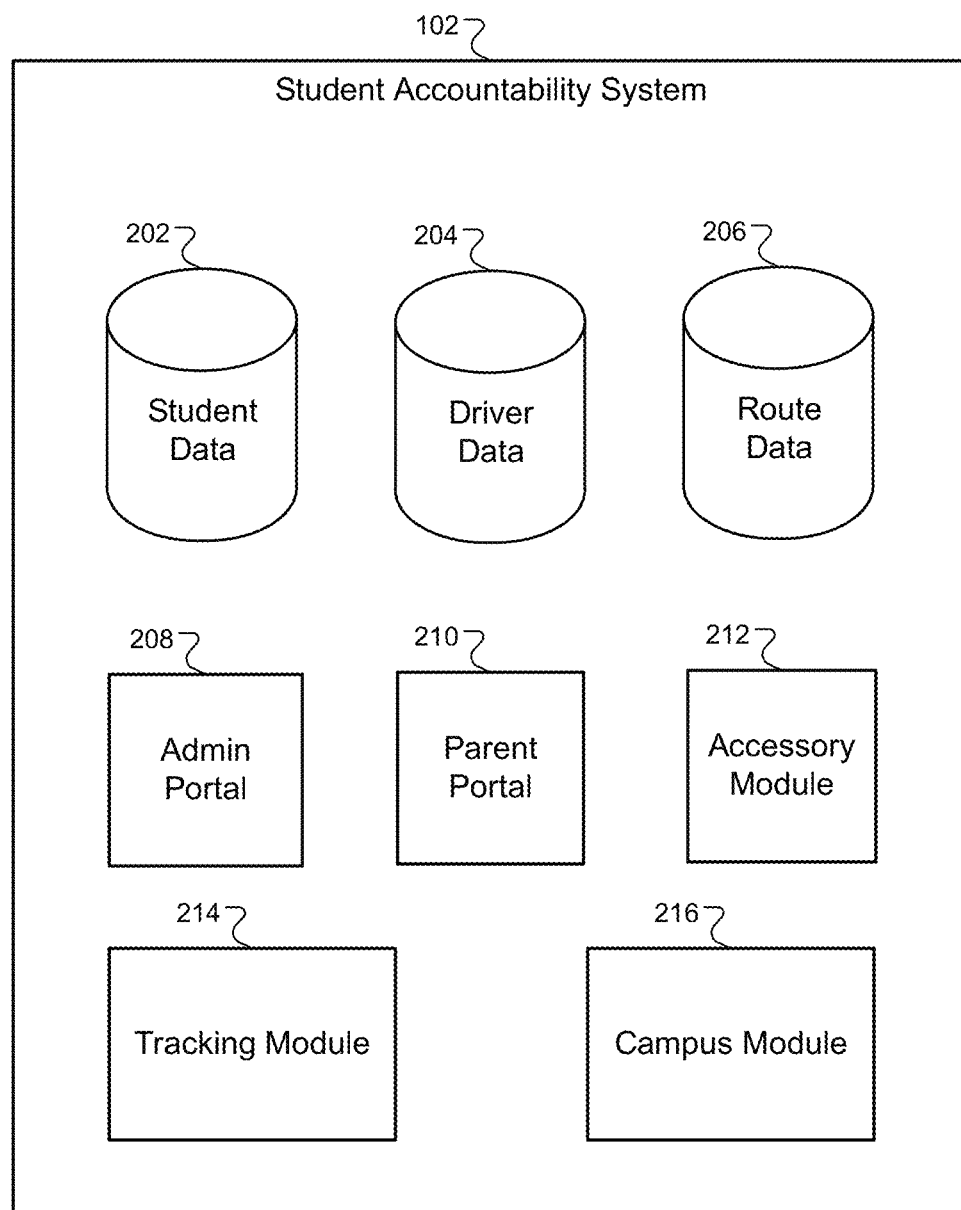
FIG. 2 is a block diagram of an example student accountability system.

FIG. 2 is a block diagram of an example student accountability system 102. The student accountability system 102 can be implemented using a server system of one or more computers which can be distributed, e.g., within a data center or across different geographic regions using a network.

The system stores student data 202, driver data 204, and route data 206. The system includes executable software modules including an administrator portal 208, a parent portal 210, and an accessory module 212. The system also includes a tracking module 214 which receives location and student status information from bus systems 106a-b and provides relevant information to the parent portal 210 and the administrator portal 208. The system includes a campus module 216 to interface with the campus system 126 that includes one or more student ID readers positioned in different locations on a campus, e.g., in doorways to rooms or buildings or walkways.

The student data 202 can be populated by an administrator 114, by parents 118a-b, or a combination of both. For example, parents 118a-b can be instructed to log in to the parent portal 210 to populate the student data 202 with information about their students. Administrators can populate the student data 202 with data from parents who are unable or do not wish to access the parent portal 210.

The student data 202 can include a unique student identifier (ID) for each student. The IDs can be generated by the system 102 or by an administrator 114. Each student ID can be associated in the student data 202 with a student's name and other optional information, e.g., one or more photographs of the student. Each student ID is associated with one or more bus routes stored in the route data 206. Each student ID can also be associated with one or more parent or guardian names and with contact information for parents or emergency contacts or for others.

In some implementations, some student IDs are associated with a list of individuals who are authorized to receive a student who is leaving a bus. The list can be displayed to a driver using a display device of a bus system 106 so that the driver can confirm that a student is being released to an authorized individual.

The driver data 204 is typically populated by the administrator 114 and includes a unique ID for each driver who will be driving in the administrator's school system. Each driver ID is associated with one or more routes in the route data 206 that the driver will be driving on. The driver IDs can be associated with other information, e.g., a log of completed driver status checks.

The route data 206 is typically populated by the administrator 114. The route data 206 specifies a number of routes for the buses to complete to pick up and drop off students for going to and from schools. The route data can be specified using the administrator portal 208. For example, the administrator portal can present a map in a graphical user interface to the administrator 114, and the administrator 114 can then drop pins on the map to specify the route. The administrator can also assign driver IDs to the routes to specify which drivers are driving which routes.

The administrator portal 208 provides an administrator 114 with relevant information from the tracking module 114. For example, the administrator portal 208 can display the locations of multiple buses in the school system and lists of students on the buses. The parent portal 210 provides parents 118a-b with relevant information to the parents' students from the tracking module 114. For example, the parent portal 210 can provide a parent with the location of the bus that the parent's student is riding.

The accessory module 212 is configured to interface with another school computer system. For example, the accessory module 212 can communicate with a cafeteria computer system or a library computer system. A parent can log into the parent portal 210 and add cafeteria credits to a student's account and see what books the student has checked out from the library.

The tracking module 214 receives location information and student status information from the bus systems 106a-b. For example, the tracking module 214 can receive location coordinates from the bus systems 106a-b, lists of students that are riding the buses, and lists of students that have been dropped off at designated stops. The tracking module 214 provides relevant information to the administrator portal 208 and the parent portal 210.

The campus module 216 receives student IDs from student ID readers that are positioned around a campus or building. As students pass by the student ID readers, the student ID readers read student IDs from the students' ID systems and send the student IDs to the campus module 216. The campus module 216 stores information associating each student ID reader with a geographic location. An administrator or parent, using the admin or parent portal, can determine the location of a student by observing the last recorded location of the student's ID by the campus system.

Figure 3:
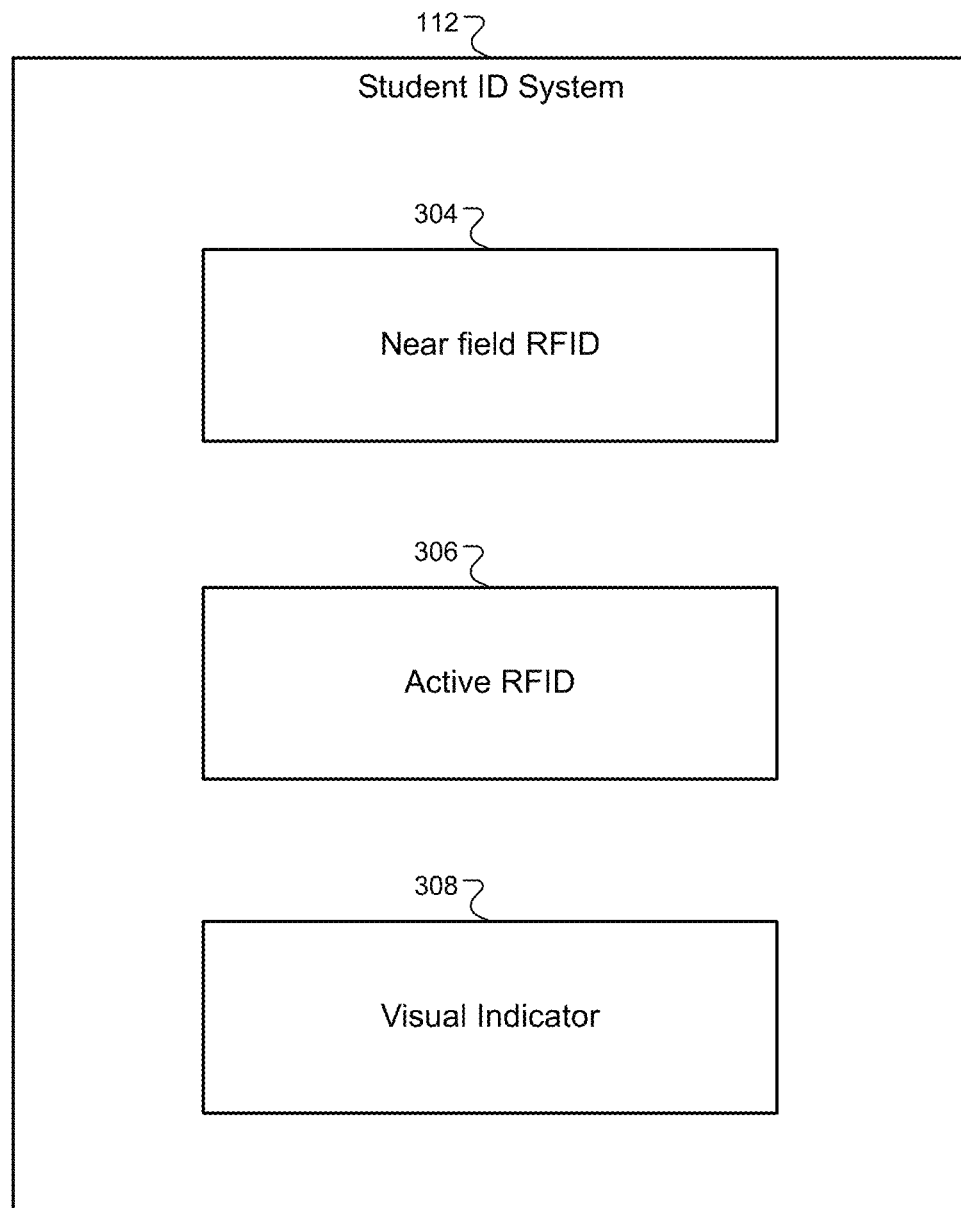
FIG. 3 is a block diagram of an example student ID system.

FIG. 3 is a block diagram of an example student ID system 112. The student ID system 112 includes multiple different types of identifiers. Each of the identifiers can provide the same unique student ID for a given student. The student ID system 112 can be contained in any appropriate container, e.g., a card that a student can keep in a pocket, a card attached to a lanyard that goes around the neck, or in a wristband module.

The student ID system 112 includes a near-field RFID module 304. The near-field RFID module is energized by an RFID interrogator when the student ID system is presented to the RFID interrogator. The student ID system also includes an active RFID module 306, which includes a power source and is capable of transmitting the unique student ID without being energized by an interrogator. The student ID system 112 includes a visual indicator 308 of the unique student ID. The visual indicator 308 can be a bar code or a quick response (QR) code or even printed characters that express the unique student ID.

By having multiple identifiers, the student ID system 112 can be used in multiple settings, and the students only have to carry one form of identification. For example, a student can use the near-field RFID module 304 to check out books at the library, and the student can use the visual indicator 308 to purchase food from the cafeteria.

The student can use the active RFID module 306 when boarding a bus, for example, so that students do not have to individually swipe their IDs as the board. In that example, the bus system 106 can poll the students' ID systems after all the students have boarded to improve boarding time. Alternatively, students can use the near-field RFID module 304 while boarding the bus, e.g., so that the driver can individually confirm every student as the students board.

Additionally or alternatively, students can use the active RFID module with the campus system 126. For example, the campus system can include RFID interrogators within a number of classrooms, and an administrator can get the student IDs of the students in a given classroom by polling the student ID systems of the students in the classroom.

Figure 4:
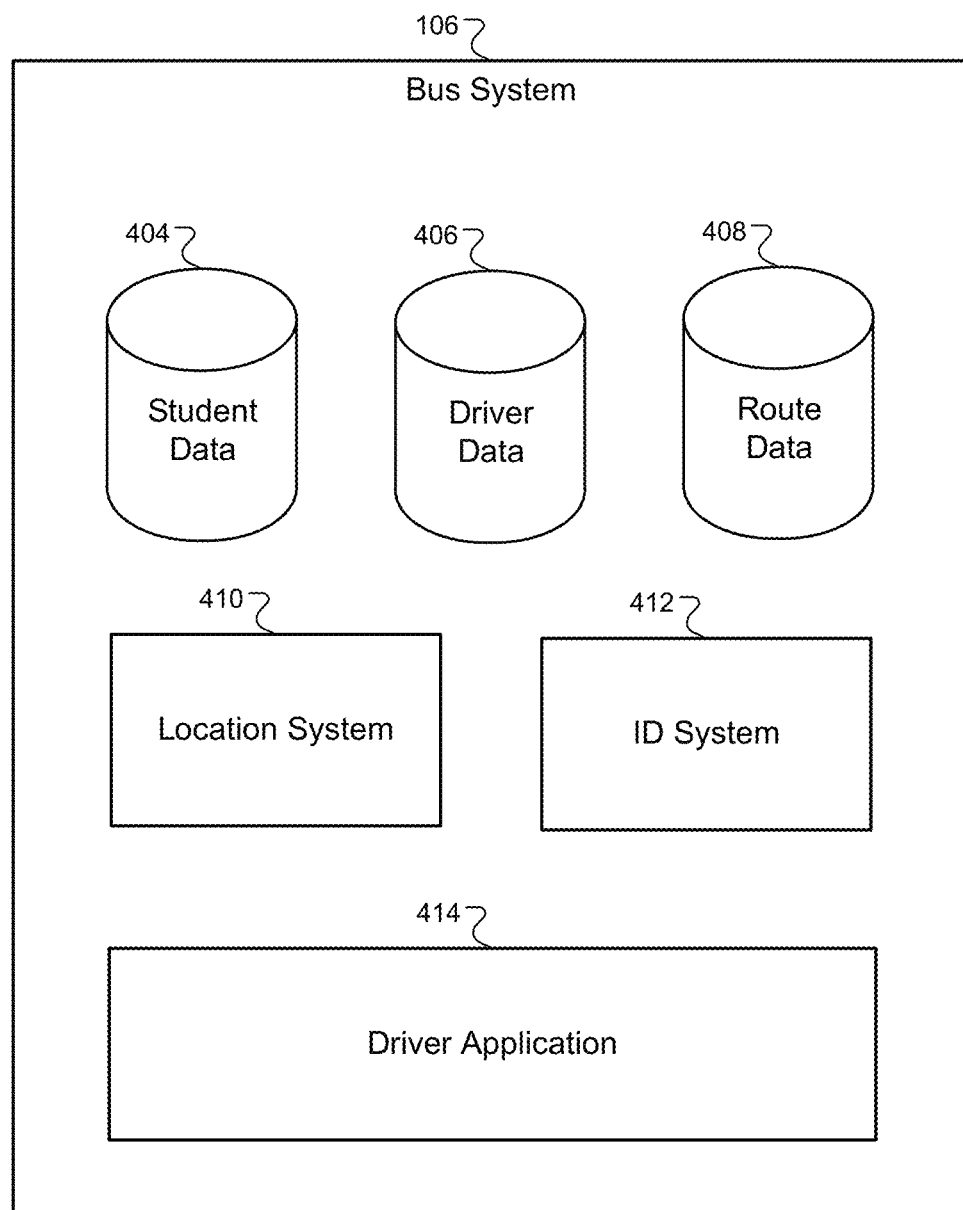
FIG. 4 is a block diagram of an example bus system.

FIG. 4 is a block diagram of an example bus system 106. The bus system 106 can be any appropriate computer system, e.g., a laptop or a personal computer or a smart phone. For purposes of illustration, the bus system 106 will be described as being a tablet computer having a touch screen display.

The bus system 106 can be attached to the bus or carried by the bus driver. In some implementations, the bus system 106 is mounted at the front of the bus, between the driver and the bus door. A claw grip device can be secured to the bus, and the bus system can be mounted or removed by sliding or pushing the bus system into the claw grip device. Students can present a student ID system 112 to the bus system while entering or exiting the bus. The driver can see the display and reach the display to perform any needed functions, and the driver can remove the bus system 106 if needed, e.g., to perform a vehicle check after completing a route.

The bus system 106 stores student data 404, driver data 406, and route data 408. In some implementations, the bus system 106 only stores the student, driver, and route needed for a particular route or number of routes to be completed on a given day. The bus system 106 can download the needed information from the student accountability system 102, e.g., over the cellular network 108, when a driver logs into the bus system 106.

The bus system includes a location system 410 and an ID system 412. The location system 410 is configured to determine a location of the bus system, e.g., using GPS or by any other appropriate locating technology. The ID system 412 is configured to receive student IDs from the student ID systems 112a-d and can also be used to identify drivers who carry driver ID systems. For example, the ID system 412 can be an RFID interrogator or a bar code reader.

The bus system includes a driver application 414. The driver application 414 is configured for rapid boarding of students and accurate reporting. The driver application 414 can send information to the student accountability system 102, which can in turn send out alerts. For example, the student accountability system 102 can send out an alert to everyone on a list associated with a student ID when the student's bus is a certain amount of time from arriving as the student's designated stop.

The driver application 414 can perform automatic route transitioning. For example, suppose that a bus covers two routes in a morning, one to an elementary school and one to a middle school. After all of the students have been dropped off at the elementary school, the bus driver starts driving the route for the middle school students. The driver application 414, using the location module, can determine that the bus has started the later route and automatically load route data for the later route.

The driver application 414 can also be used in a route learning mode. The routes stored in the route data can be created by a school administrator dropping pins onto a map displayed by a mapping application, and in some cases, the stop locations will not be correct. In the route learning mode, a driver can drive to all of the stops on the route, push a button when the bus is located at a stop, and have the driver application 414 record a precise location of the bus at the stop. The route data in the student accountability system can then be updated with the recorded locations.

In some implementations, the driver application 414 can validate whether or not a pre or post trip inspection has been completed by a driver. The driver application 414 uses location information and time stamp information to validate the inspection. For example, the driver application 414 can generate a flag or a report for an administrator if the location module indicates that the bus system stayed in the same location while the driver enters information as part of the inspection. In some examples, fixed areas or zones are designated around the bus. As the driver performs the inspection, the driver selects a user interface element displayed by the driver application, and the driver application checks whether the location module indicates that the driver is in the correct zone for that stage of the inspection.

Figure 5A:
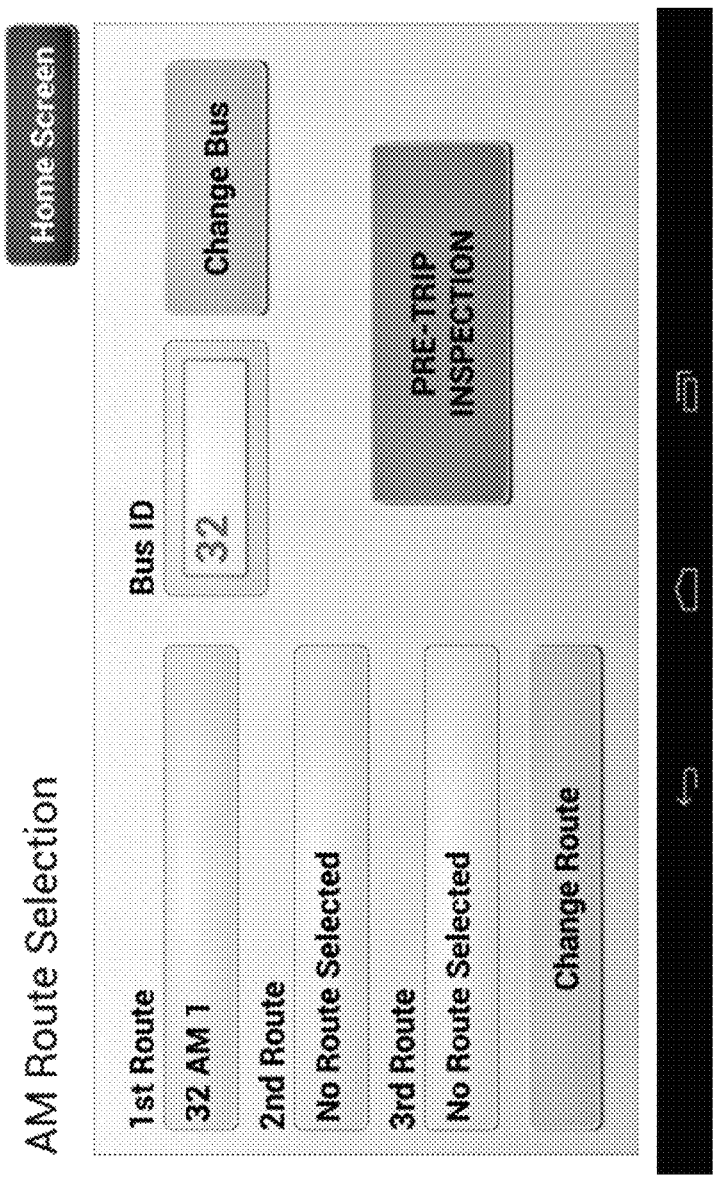
FIGS. 5A-5T show screen shots of an example GUI for the driver application and illustrate example functions that can be performed by the driver application.

The driver application 414 is configured to present a graphical user interface (GUI) to a driver. FIGS. 5A-5T show screen shots of an example GUI for the driver application and illustrate example functions that can be performed by the driver application.

FIG. 5A is a view of the driver application GUI that can be displayed after a driver logs into the bus system 106. The driver can log in, e.g., by presenting an RFID driver ID to the ID system 412 of the bus system 106. The GUI displays an identifier for the bus and a number of routes that the bus system 106 automatically loads for the driver based on the driver's ID. The bus system 106 can load the routes from the student accountability system 102. The GUI can also display a button that takes the driver to a pre-trip inspection screen, e.g., that the driver uses while performing an inspection of the bus prior to driving a route.

Figure 5B:
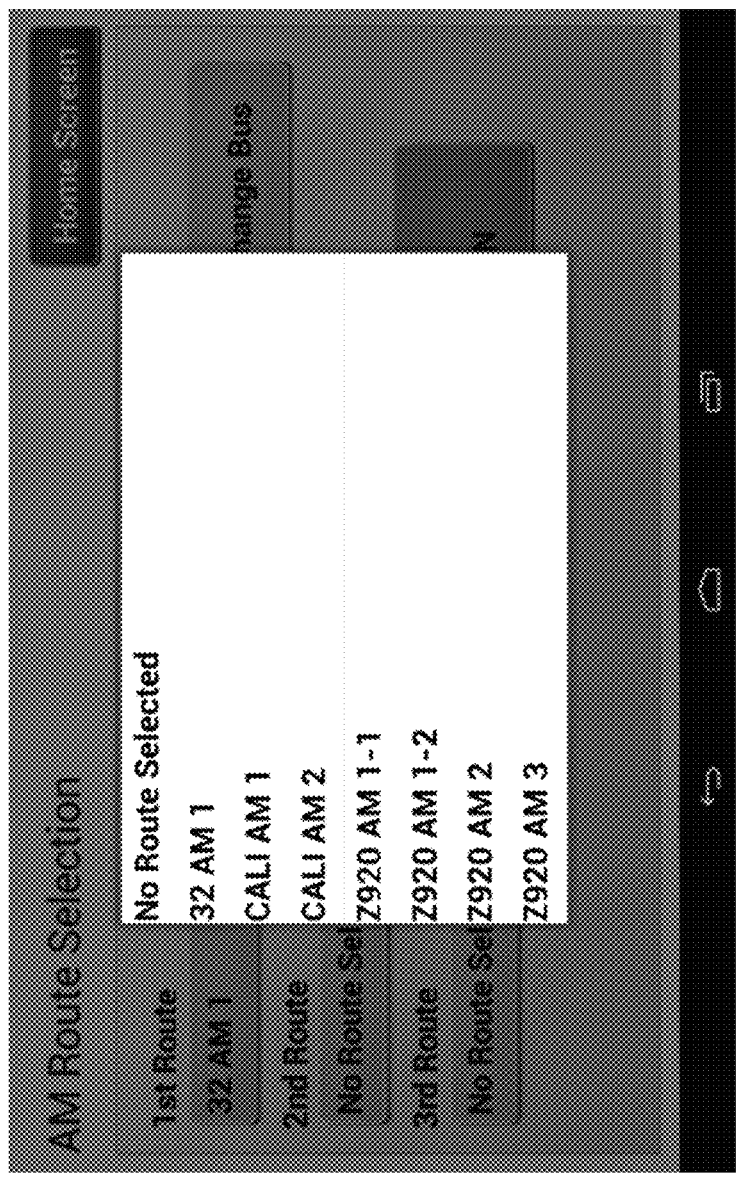

FIG. 5B is a view of the driver application GUI that the driver application can display when a substitute driver logs on to the bus system 106. Upon recognizing that the driver is a substitute driver, the driver application displays that no route is selected. The substitute driver can select a button to active a pop-up window that displays a list of routes to choose from.

Figure 5C:
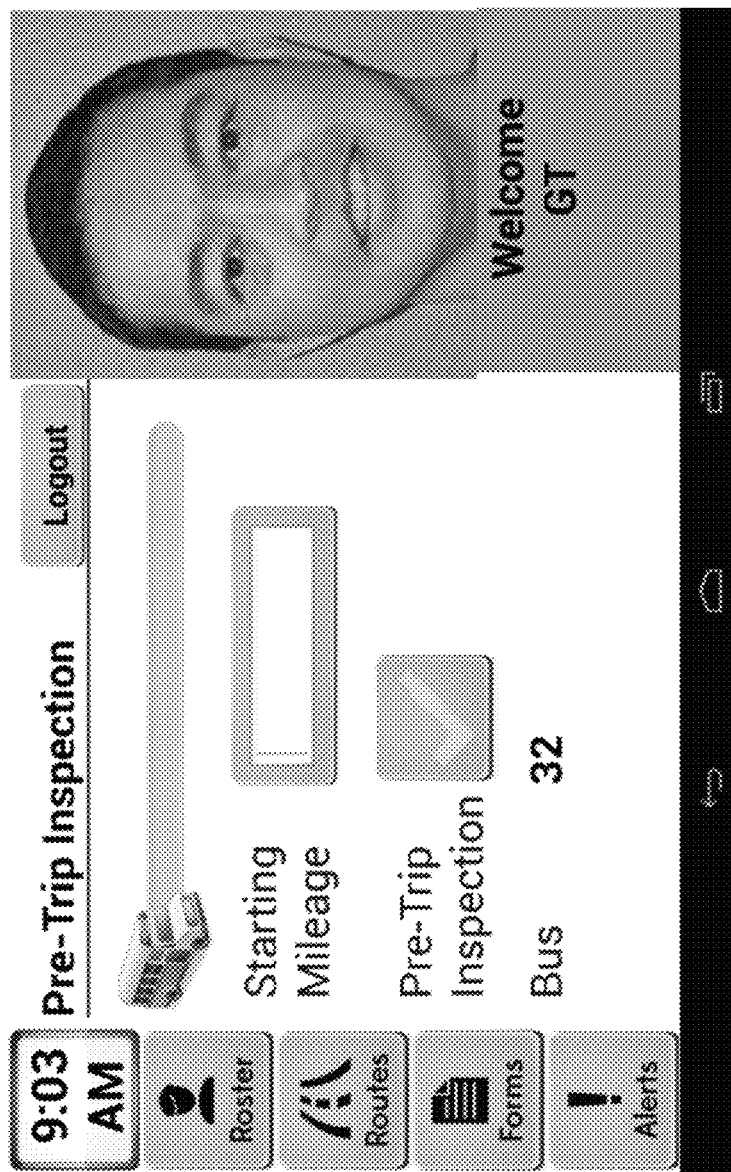

FIG. 5C is a view of the driver application GUI that the driver application can display when a driver selects the pre-trip inspection button. The driver application can prompt the driver to enter certain information, e.g., the starting mileage of the bus.

Figure 5D:
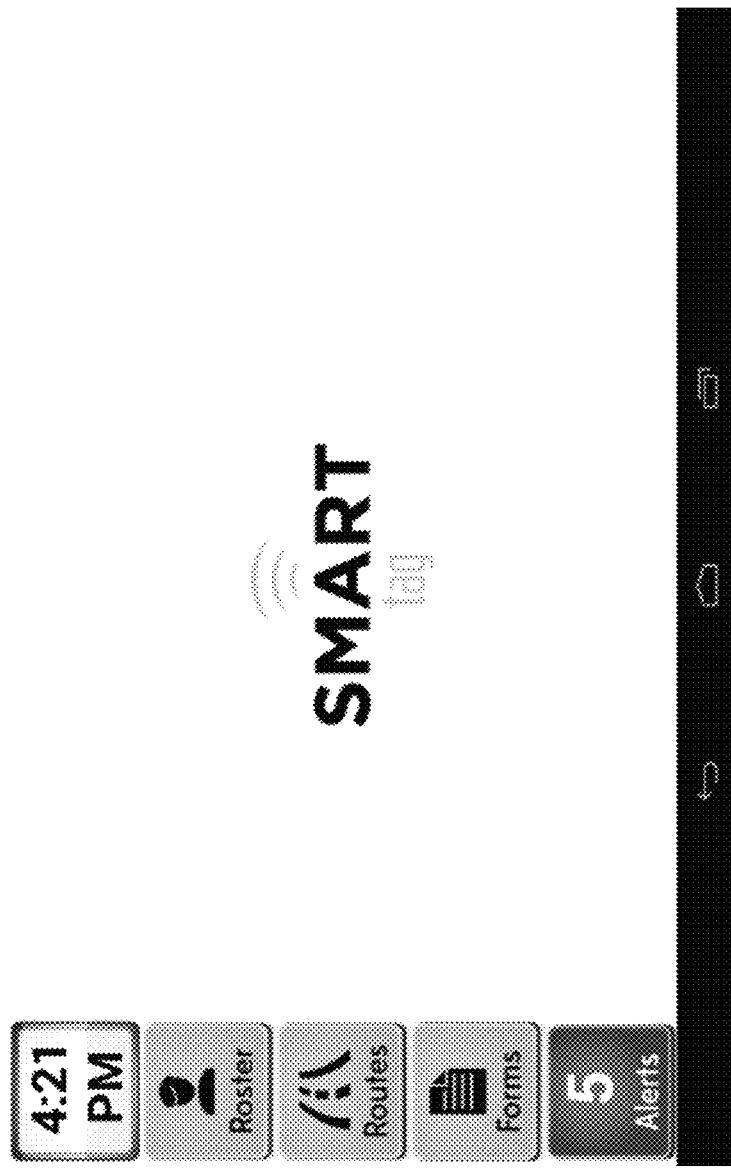

FIG. 5D is a view of a home screen for the driver application. The home screen has a navigation bar with various buttons. One of the buttons can display the current time, which is useful to ensure that drivers are running on the correct time to improve fleet wide efficiency. Another button can display roster information; pressing the roster button enables a driver to view the student roster in different views. The navigation bar can also include buttons to access route data, forms, and alerts that have been sent to the bus system 106 from the student accountability system 102.

Figure 5E:
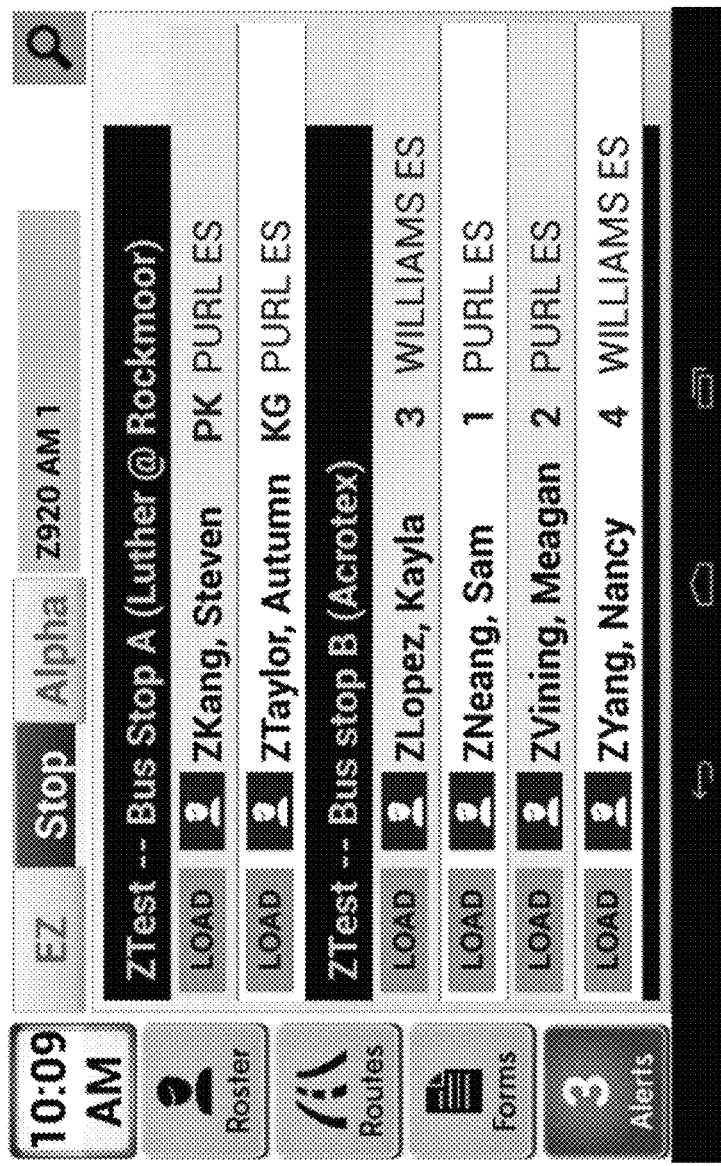

FIG. 5E is a view of the driver application GUI that can be displayed while students are boarding. From the view, the driver can select one of three different types of views. In an "EZ" view, the driver sees a complete list of actual students riding the bus. From a "Stop" view, the driver sees a list of riders grouped by their designated stop. From an "Alpha" view, the driver sees a complete list of eligible riders.

Figure 5F:
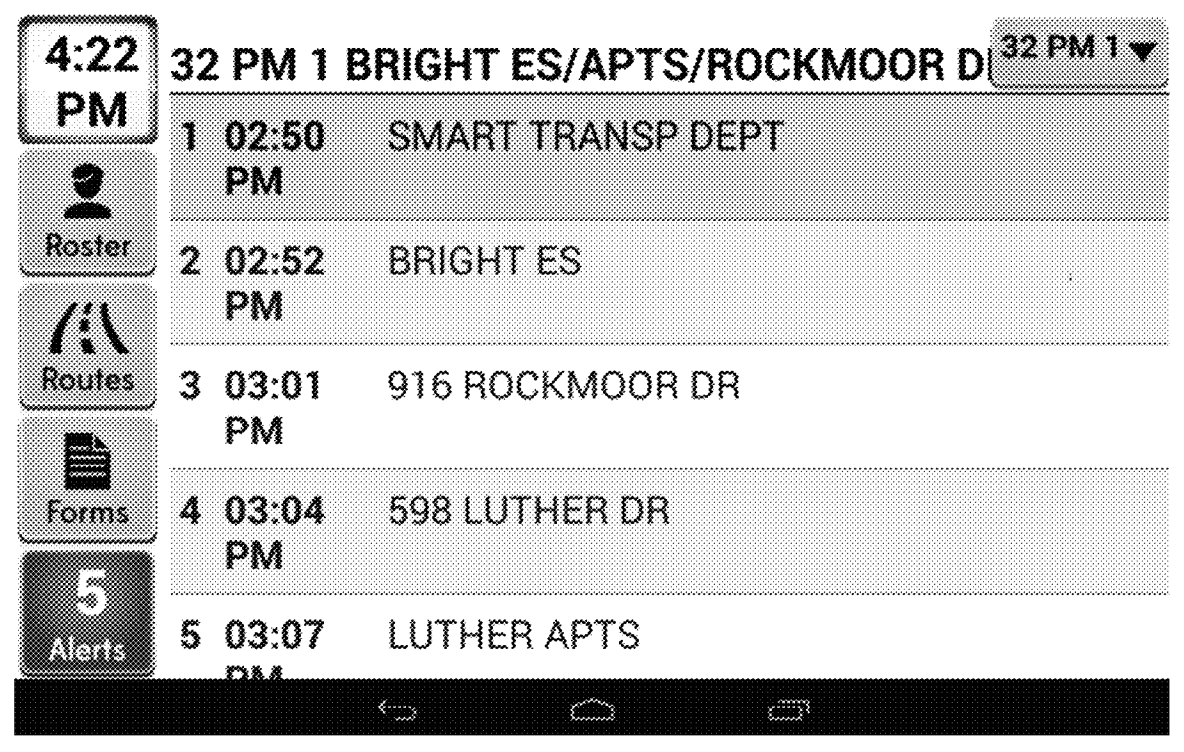

FIG. 5F is a view of the driver application GUI that can be displayed when the driver selects the "routes" button from the navigation bar. The view displays a list of stops for a current route. The driver application can use the location module to determine the location of the bus and highlight a current stop on the list corresponding to the bus's location. At a glance, drivers can know what the next stop is and what time they should be there.

Figure 5G:
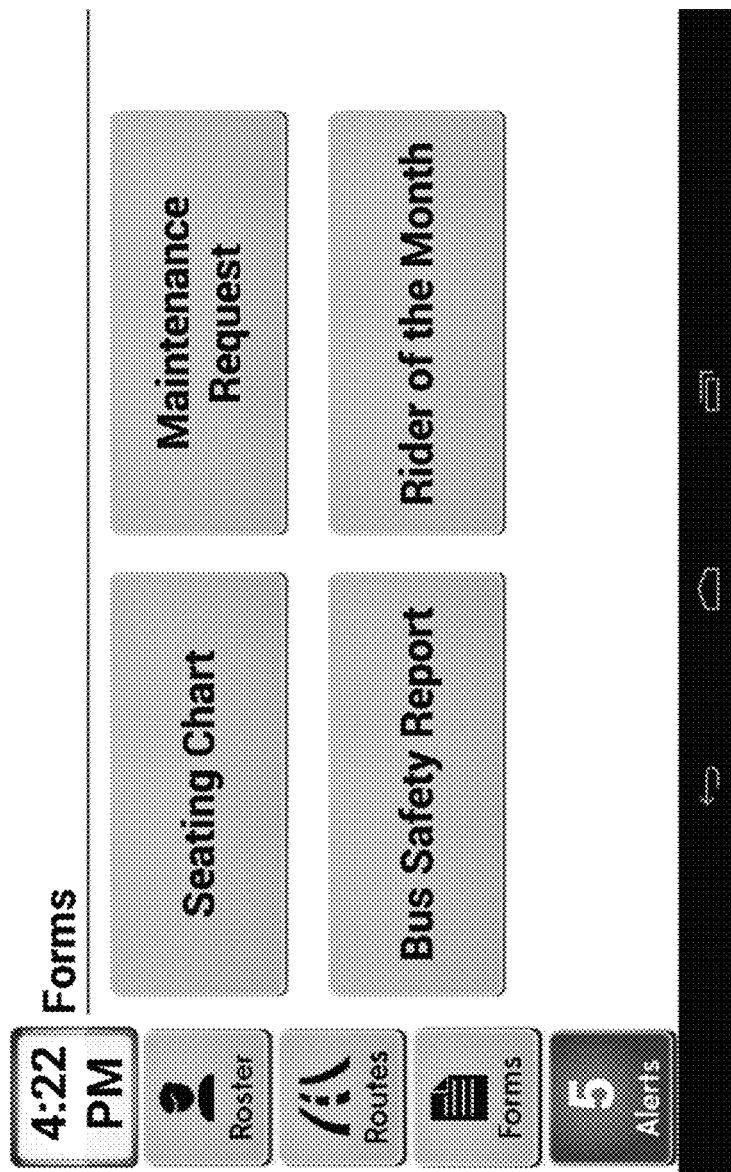

FIG. 5G is a view of the driver application GUI that can be displayed when the driver selects the "forms" button from the navigation bar. A school system can populate the available forms with customized forms for the school system. For example, the driver can fill out bus safety reports, or customize a seating chart.

Figure 5H:
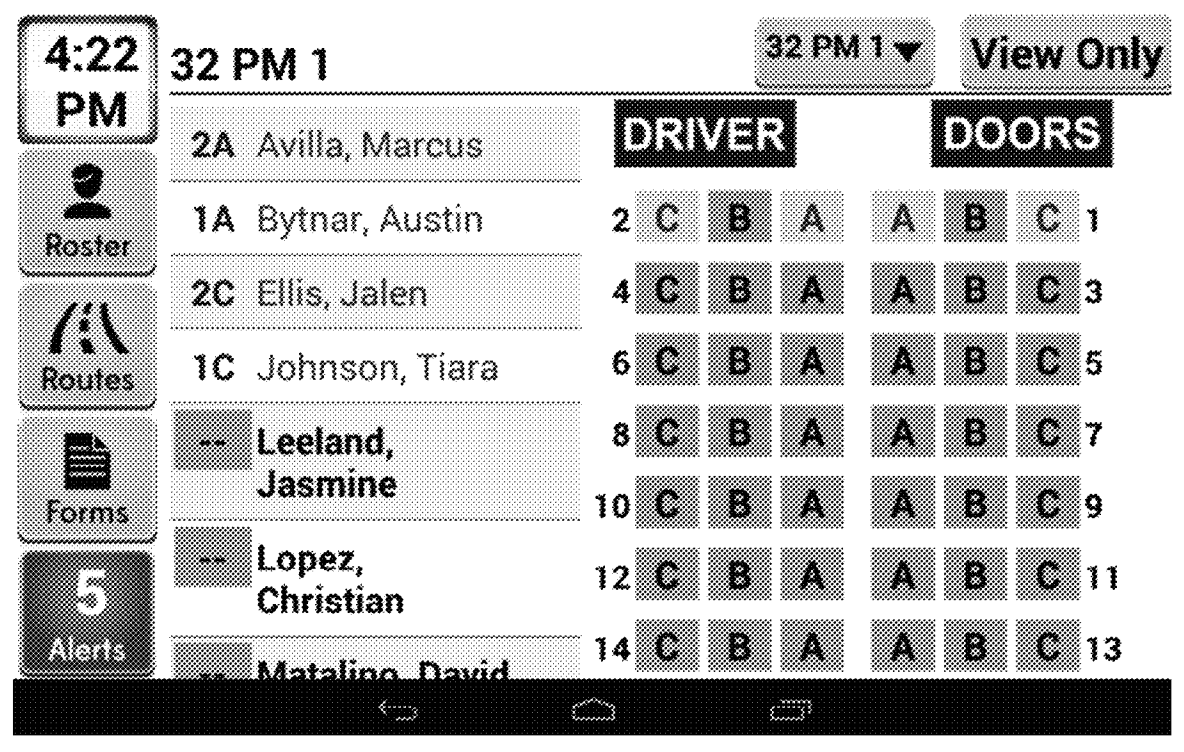

FIG. 5H is a view of a customizable seating chart as presented in the driver application GUI. A driver can drag and drop names from a list onto a two dimensional representation of the seats on the bus. The driver application can then send the seating chart to the student accountability system 102.

Figure 5I:

FIG. 5I is a view of the driver application GUI that can be displayed when the driver selects the "alerts" button from the navigation bar. The student accountability system 102 can send the alerts to the bus system 106. The alerts can be displayed a list of messages with indicators showing whether each of the messages have been read. When the driver selects one of the messages from the list, the message is displayed.

Figure 5J:
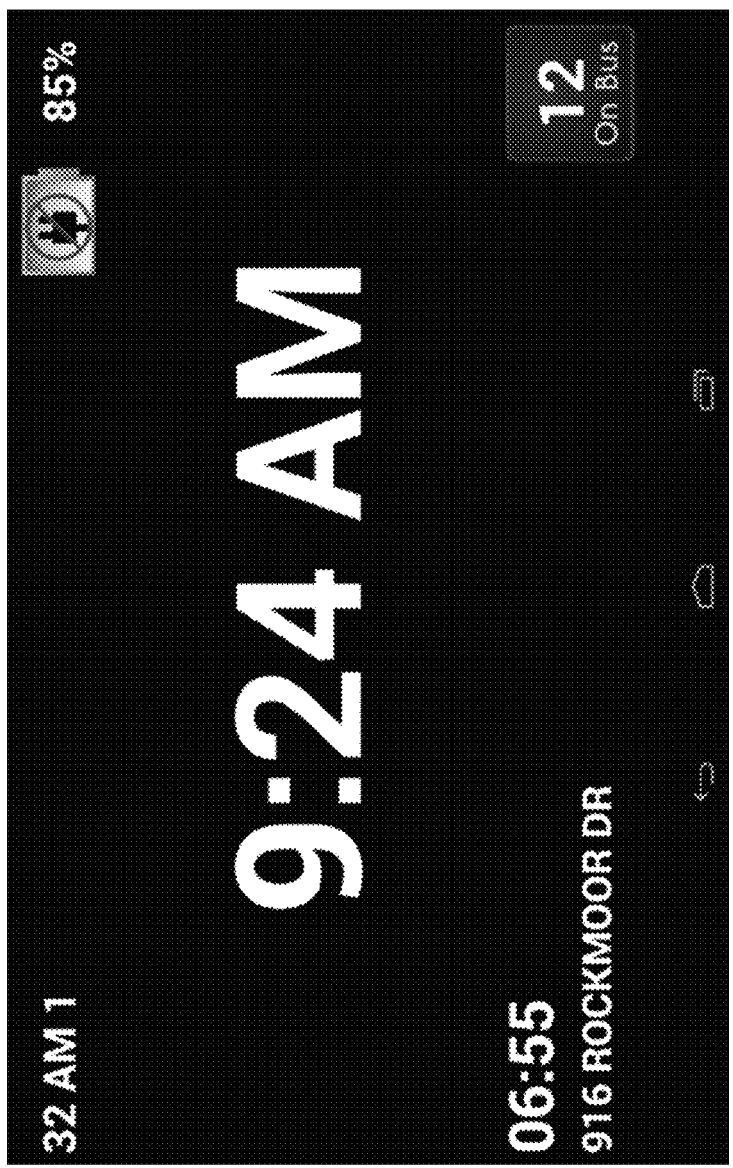

FIG. 5J is a view of the driver application GUI that can be displayed while the driver is driving the bus. In this "drive mode," the driver application can display the route and battery life, the current time, the time the bus should be at the next stop, the next stop address, and how many students are on the bus. Keeping the drive mode view uncluttered can prevent the driver application from distracting the driver.

Figure 5K:
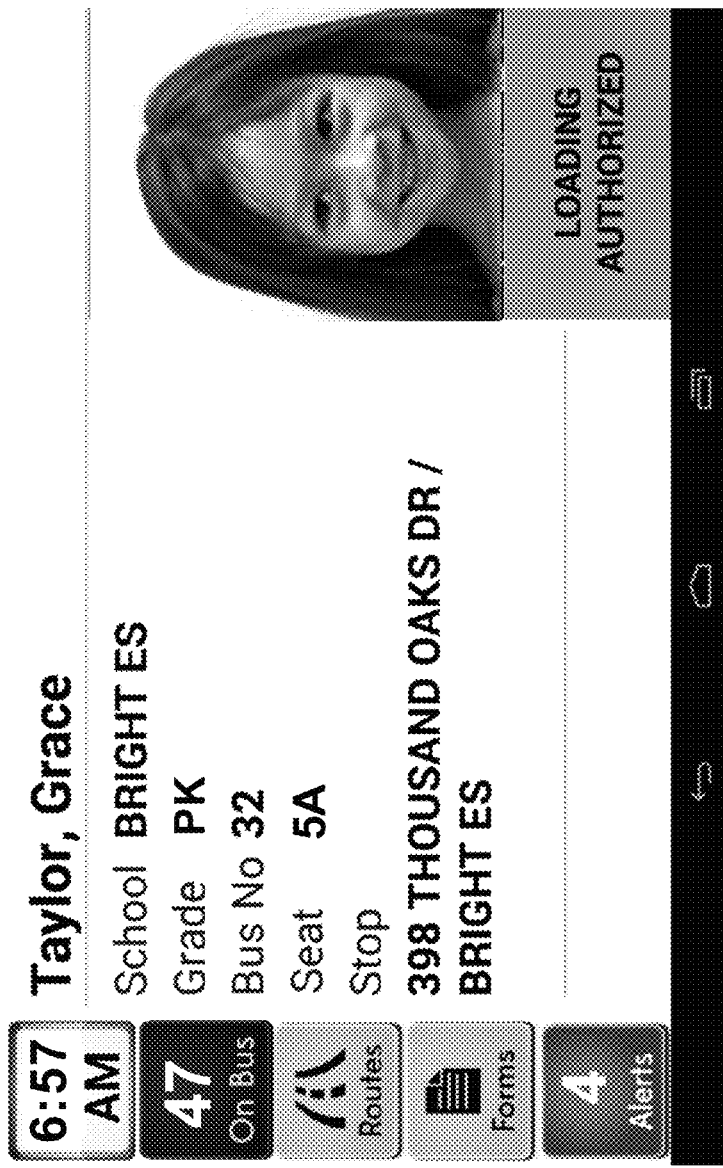

FIG. 5K is a view of the driver application GUI that can be displayed while students are boarding the bus. As a student presents a student ID system 112 to the bus system 106, the bus system 106 determines the student's ID and then checks that the student is authorized to ride the current route. The driver application can present the student's name, picture, and other optional information. Presenting the student's name and picture can help the driver learn the students' names, which can be useful in preventing bad behavior on the bus. The driver application can also present a count of the number of students on the bus that increases as students board the bus, or decreases as students exit the bus.

Figure 5L:
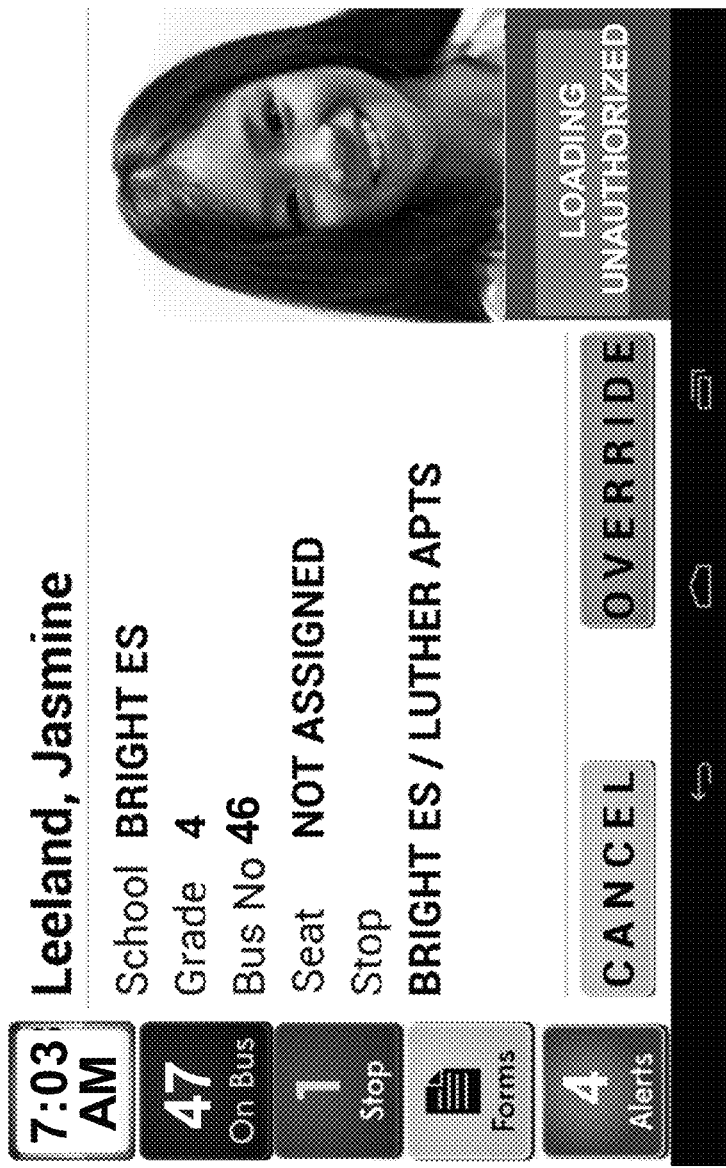

FIG. 5L is a view of the driver application GUI that can be displayed when an unauthorized student boards the bus. When an unauthorized student boards, the bus system 106 can play an alarm sound, and an indicator can be displayed on the screen to show that the student is unauthorized. The driver application presents buttons to allow the driver to cancel the boarding, e.g., if the student does not board, or to override the objection and allow the student to board. When the driver selects the override button, the student is added to the roster so that the driver application can account for the student when the students are exiting the bus.

Figure 5M:
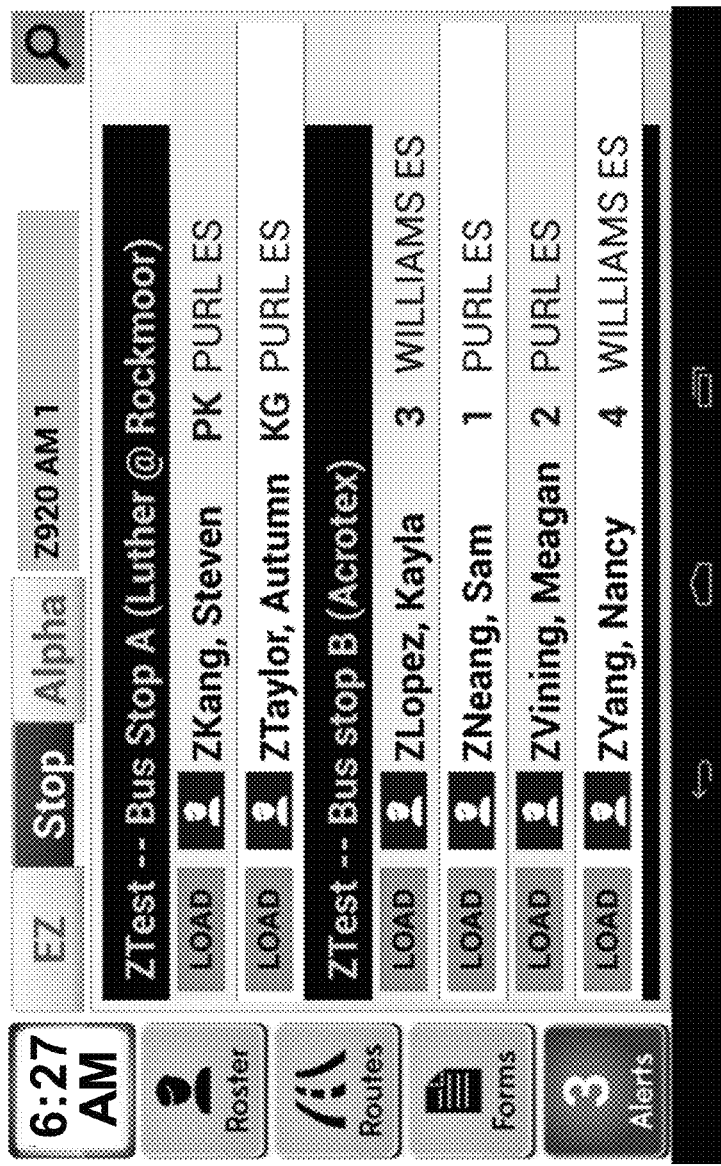

FIG. 5M is a view of the driver application GUI that can be displayed when a student forgets or loses their student ID system. The driver can select the "roster" button and then presses a "load" button next to the student's name, thereby manually boarding the student. To increase the speed of boarding when manually boarding a student, then driver application can display a list of the students assigned to the current stop at the top of the list of students, and the driver application can move students who have already boarded to the bottom of the list. Moving students who have already boarded to the bottom of the list can help the driver find the correct student name for the student who needs to be manually boarded from the list of names.

Figure 5N:
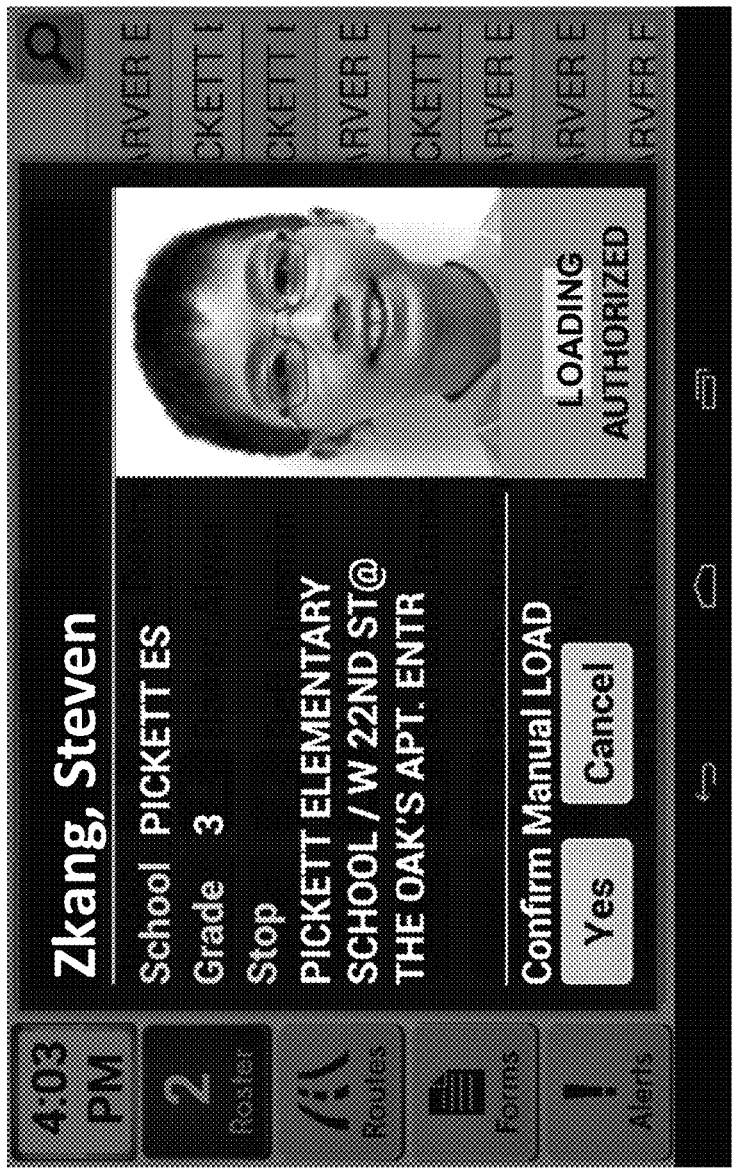
Figure 50:
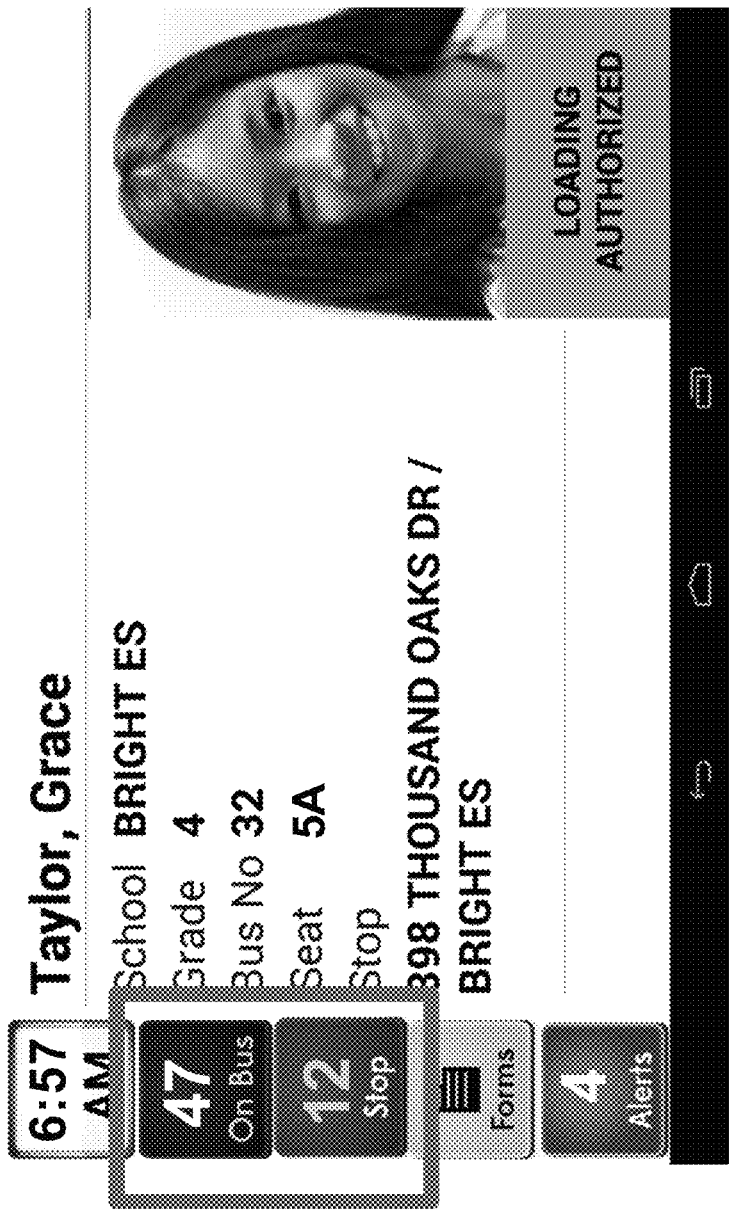

FIG. 5N is a view of the driver application GUI that can be displayed when the driver selects a student to be manually loaded. The driver application displays the students photograph and a confirmation that the student is authorized. The driver can then confirm that the student should be manually loaded.

FIG. 5O is a view of the driver application GUI that can aid drivers in making sure that students are exiting the bus at the correct stops. The view shows the number of students on the bus over the roster button and shows the number of students to be picked up or dropped off at the next stop.

Figure 5P:
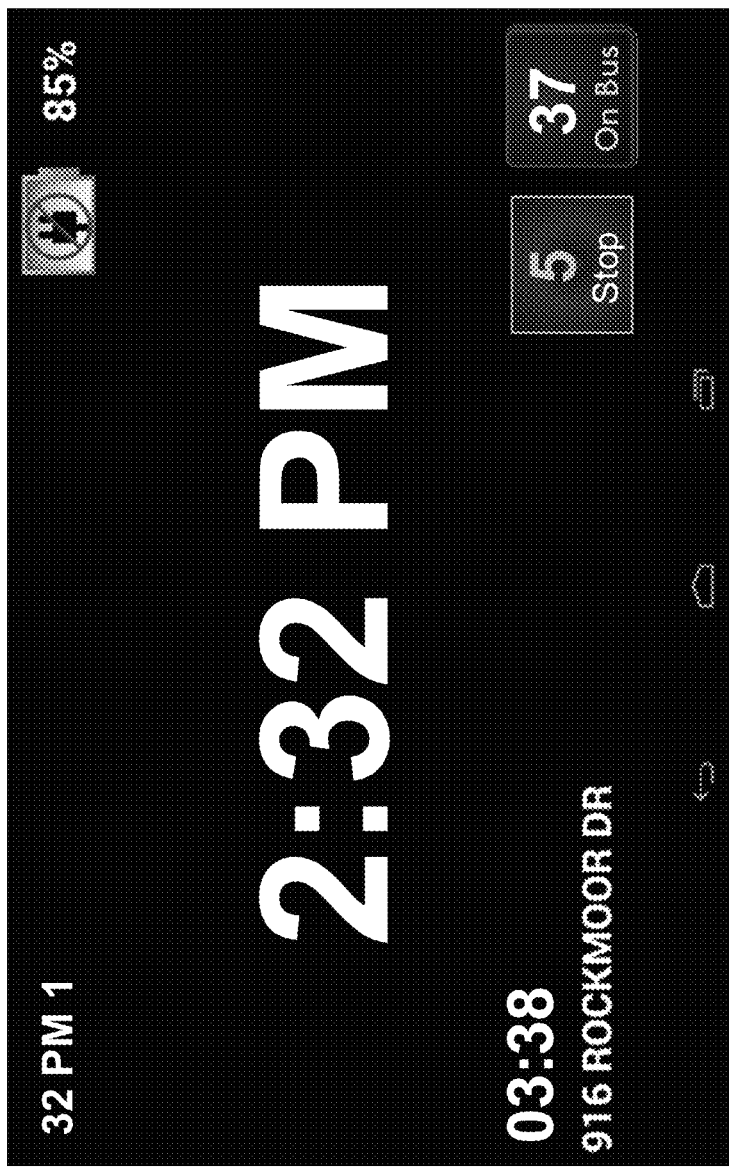

FIG. 5P is a view of the driver application GUI that can aid drivers in making sure that students are exiting the bus at the correct stops and can be displayed while the driver is driving. The view shows the number of students on the bus and the number of students to be picked up or dropped off at the next stop.

Figure 5Q:
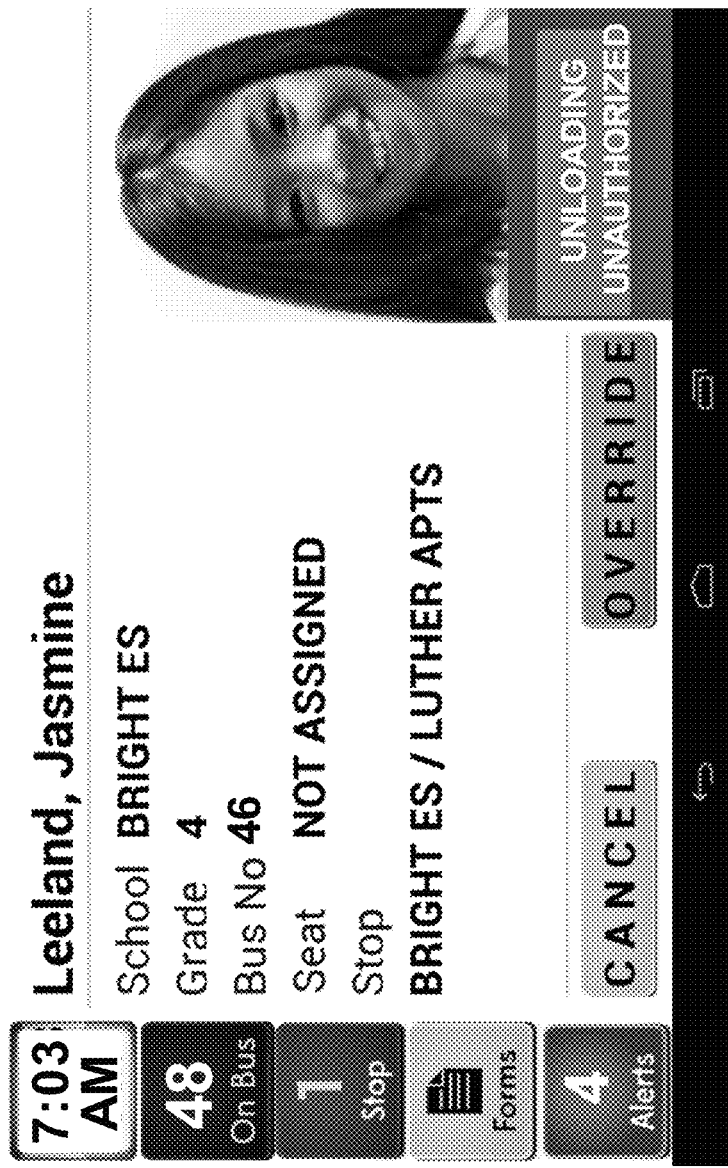

FIG. 5Q is a view of the driver application GUI that can be displayed when students are exiting the bus. The driver application informs drivers when students attempt to get off at a stop that is not their designated stop. This can be useful, e.g., when a younger elementary student mistakenly tries to get off at the wrong stop.

Figure 5R:
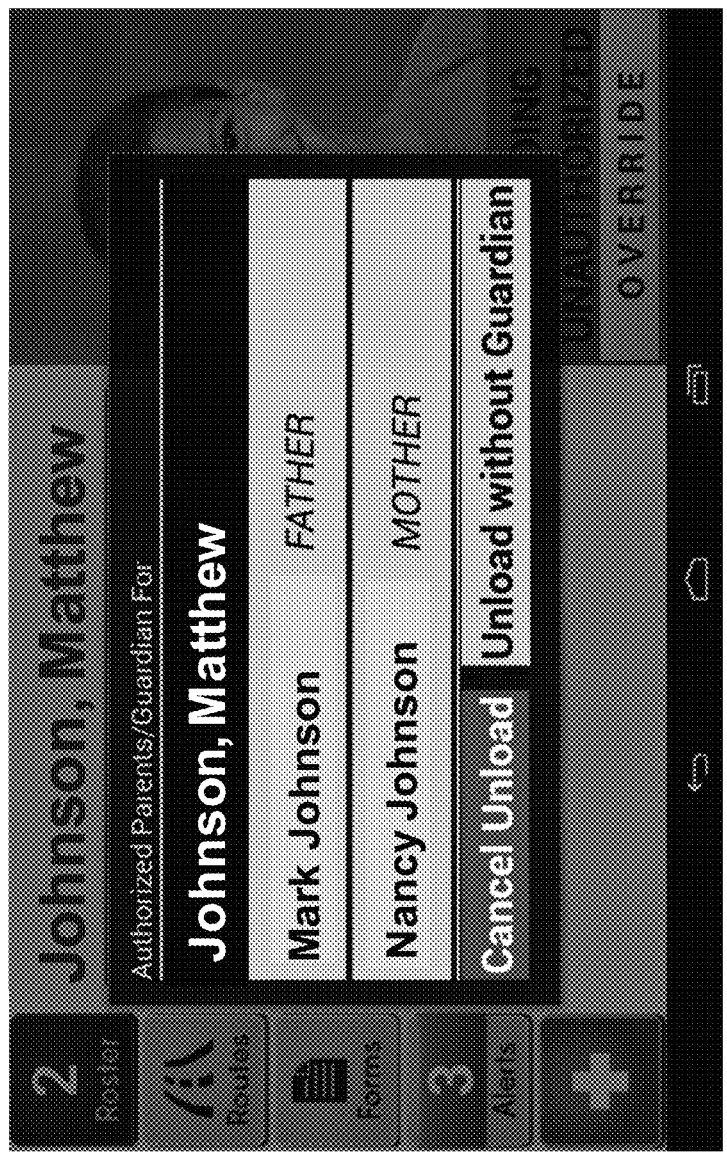

FIG. 5R is a view of the driver application GUI that can be displayed when a student is exiting the bus and the student is required to be released to a parent or guardian. When such a student presents a student ID system to the bus system, the driver application presents a list of authorized parents or guardians can also play an audio prompt to help draw the driver's attention. The driver can select one of the authorized persons from the list, or cancel the unloading or allow the student to unload without a guardian. The driver application records the event and can report it to the student accountability system 102.

Figure 5S:
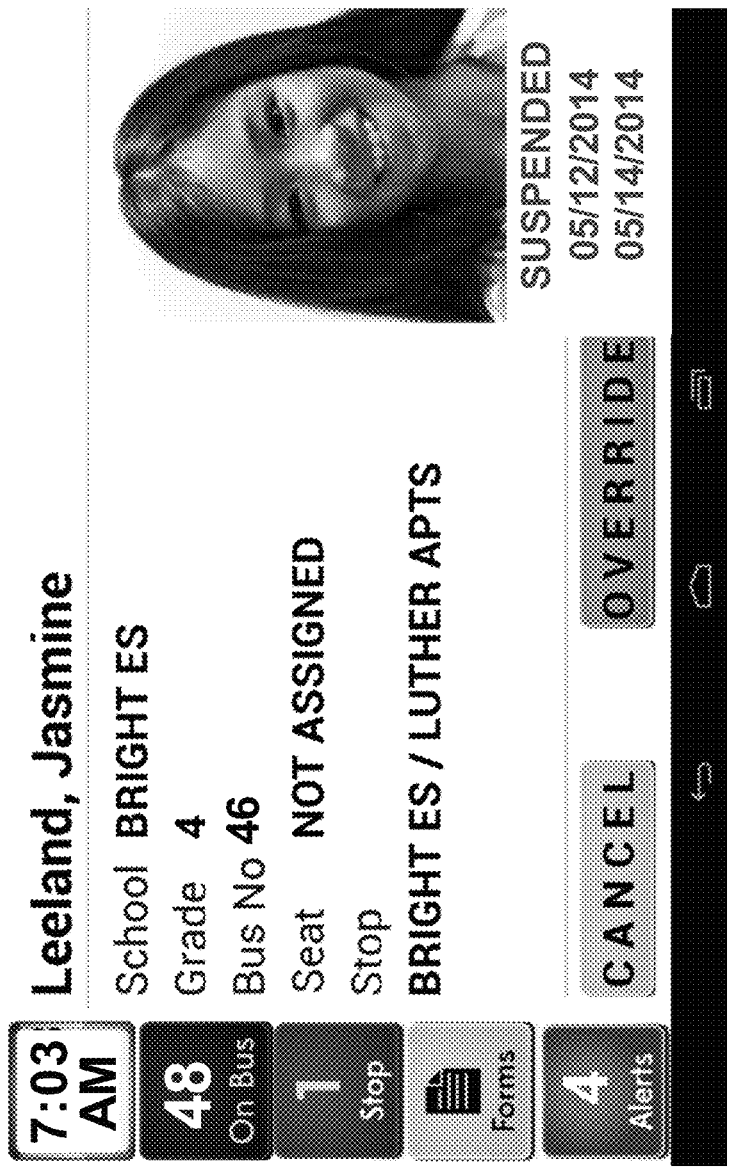
Figure 5T:
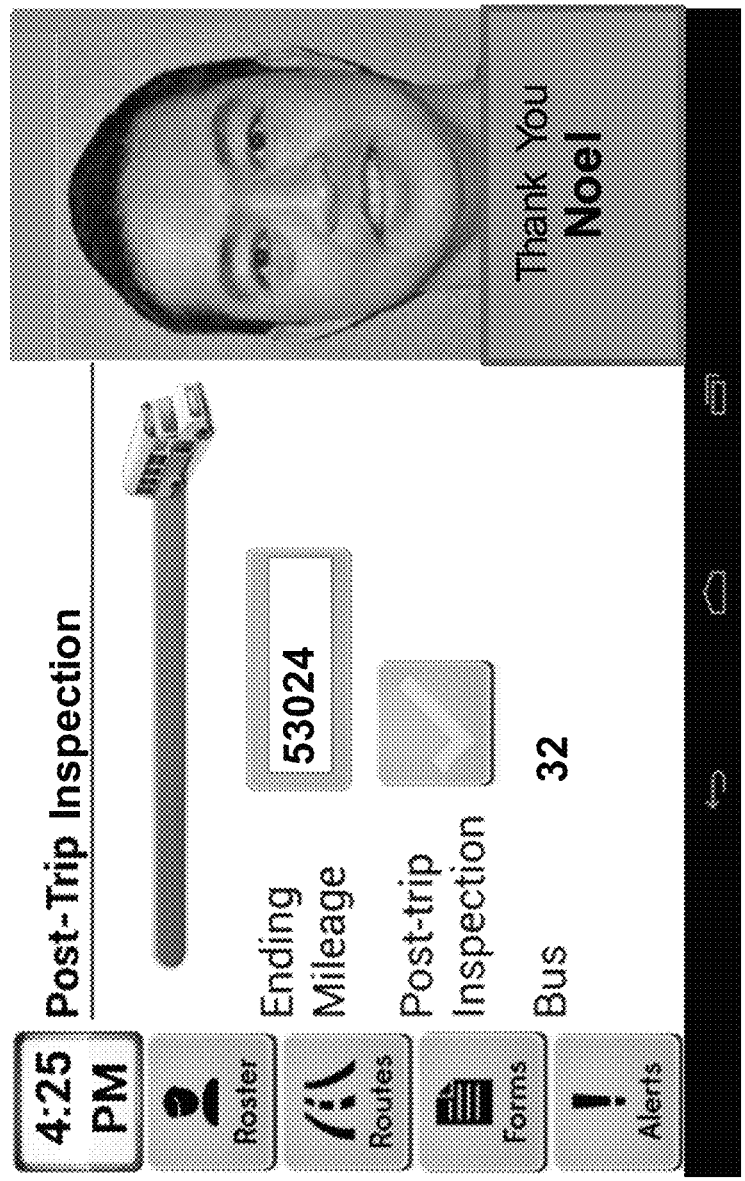

FIG. 5S is a view of the driver application GUI that can be displayed when a student is boarding the bus and the student has been suspended. The driver application can sound an alarm and present a box below the student's photograph that turns red and displays the dates of suspension.

FIG. 5T is a view of the driver application GUI that the driver application can display when a driver selects the post-trip inspection button. The driver application can prompt the driver to enter certain information, e.g., the ending mileage of the bus.

Figure 6:
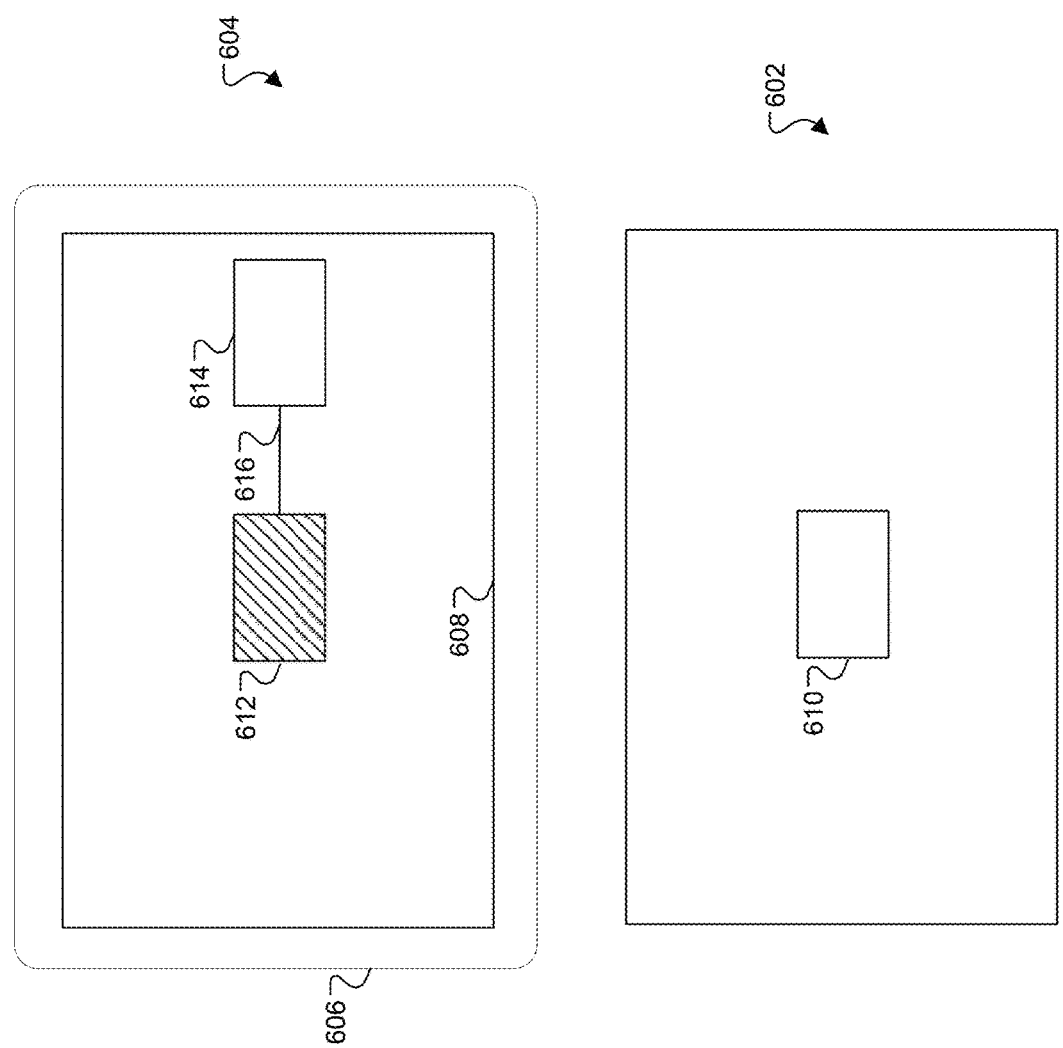
FIG. 6 is a diagram illustrating a tablet computer and a case for the tablet computer.

FIG. 6 is a diagram illustrating a tablet computer 602 and a case 604 for the tablet computer 602. The case can be made of a flexible material, e.g., silicone rubber, that provides impact protection to the tablet computer 602. The case includes an outer, thicker section 606 and an inner, thinner section 608 that is configured to receive the tablet computer 602 so that a touch screen of the tablet computer 602 faces away from the case 604.

The tablet computer 602 includes a near field RFID reader 610 on a side of the tablet computer 602 opposite the touch screen of the tablet computer 602. The inner section 608 of the case 604 includes an embedded antenna extender assembly including a first patch 612 and a second patch 614 that are electrically coupled, e.g., by a wire 616. Each patch can be formed of a conductive coil within an enclosure.

The antenna extender assembly moves the target area of the near field RFID reader 610 from the center of the tablet computer 602 to an area closer to an edge of the tablet computer 602. This is useful, e.g., where the tablet computer 602 is being used as a bus system 106. The edge of the tablet computer 602 can be a more convenient place for students to present student ID systems as they board the bus, e.g., where a gripping assembly is holding the tablet computer 602 with the screen facing the driver. By embedding the antenna extender assembly into the case 604, the tablet computer 602 can be set up to move the target area of the near field RFID reader merely by inserting the tablet computer 602 into the case 604.

Figure 7:
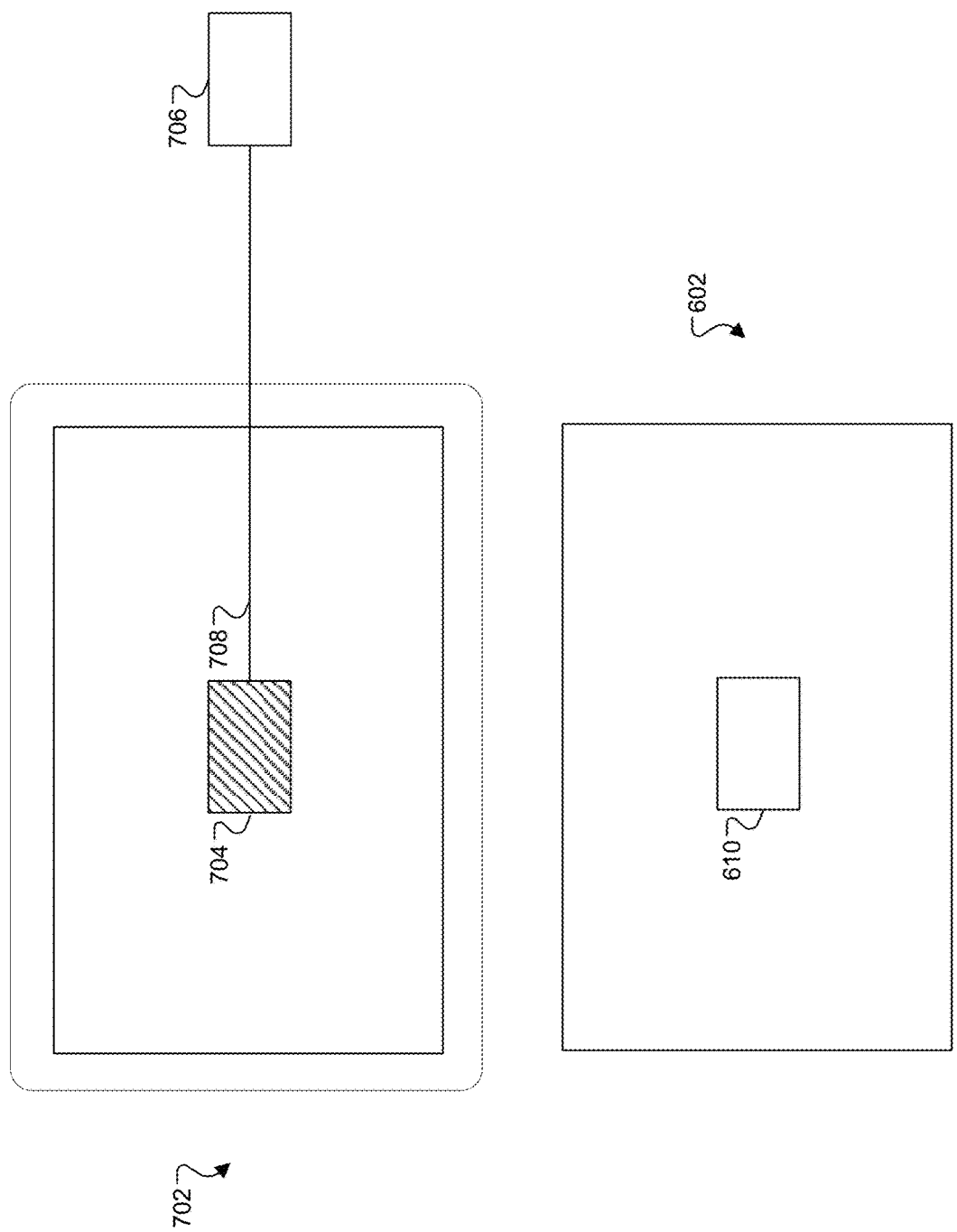
FIG. 7 is a diagram of an alternative case for the tablet computer.

FIG. 7 is a diagram of an alternative case 702 for the tablet computer 602. The case 702 of FIG. 7 has a first patch 704 of an antenna assembly embedded into the case and a second patch 706 which is free from the case and electrically coupled to the first patch 704 by a wire 708. By having the second patch 706 free from the case, the second patch 706 can be located wherever on the bus it is convenient for students to present student ID systems.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

The invention claimed is:

1. A method performed by a bus computing system for a bus, the method comprising:
   receiving, at a designated stop of multiple stops of a bus route of the bus, a student identifier (ID) from a student ID system when a student enters or exits the bus at the designated stop, each stop of the multiple stops of the bus route being associated with a respective list of authorized students to enter or exit the bus;
   determining whether the student associated with the student ID is authorized to enter or exit the bus at the designated stop of the multiple stops of the bus route; and in response to determining that the student is not authorized to enter or exit the bus at the designated stop of the multiple stops of the bus route, performing an alert action to alert a driver of the bus;
   in response to determining that the student is not authorized to enter or exit the bus at the designated stop, presenting an override user interface element on a display of the bus computing system for overriding a lack of authorization, receiving input from the driver selecting the user interface element, and adding or removing the student ID to or from a roster for the bus to allow the student to enter or exit the bus at the designated stop.

2. The method of claim 1, further comprising:
   in response to receiving the student ID from the student ID system, presenting at least one of a name of the student or a photo of the student on the display.

3. The method of claim 1, further comprising:
   in response to determining that the student is not authorized to enter or exit the bus at the designated stop, presenting a cancellation user interface element on the display for refusing the student to enter or exit at the designated stop.

4. The method of claim 1, wherein performing the alert action comprises:
playing an alarm sound.

5. The method of claim 1, wherein performing the alert action comprises:
presenting an indicator on the display to show that the student is not authorized to enter or exit the bus at the designated stop.

6. The method of claim 5, wherein the indicator is presented adjacent to a photo of the student on the display.

7. The method of claim 1, further comprising:
receiving a second student ID from a second student ID system when a second student enters or exits the bus at the designated stop;
determining that the second student associated with the second student ID is authorized to enter or exit the bus at the designated stop;
presenting an indicator on the display to show that the second student is authorized to enter or exit the bus at the designated stop; and
adding or removing the second student ID to or from a roster for the bus.

8. The method of claim 7, further comprising:
presenting a name and a photo of the second student on the display,
wherein the indicator is presented adjacent to the photo of the second student.

9. The method of claim 7, further comprising:
in response to adding or removing the student ID to or from the roster for the bus, automatically increasing or decreasing, on the display, a count indicating a total number of the list of students on the bus by one.

10. The method of claim 1, further comprising: receiving, from the driver, an input selecting the override user interface element; and in response to receiving the input selecting the override user interface element, adding or removing the student ID to or from a roster for the bus, the roster including all students on the bus.

11. A method performed by a bus computing system for a bus, the method being for manually boarding or disembarking a student that has no student identifier (ID) system, the method comprising:
presenting, on a display of the bus computing system, a corresponding list of authorized students to enter or exit the bus at a designated stop of multiple stops of a bus route of the bus, the display positioned to be visible to a driver of the bus, each stop of the multiple stops of the bus route being associated with a respective list of authorized students to enter or exit the bus;
receiving, from the driver, a first input selecting the student from the corresponding list of authorized students, the student being authorized to enter or exit the bus at the designated stop;
in response to receiving the first input, presenting a photo of the selected student and a confirmation user interface element for confirming manually boarding or disembarking the selected student;
in response to determining that the student is not authorized to enter or exit the bus at the designated stop, presenting an override user interface element on a display of the bus computing system for overriding a lack of authorization, receiving input from the driver selecting the user interface element, and adding or removing the student ID to or from a roster for the bus to allow the student to enter or exit the bus at the designated stop.

12. The method of claim 11, wherein presenting the corresponding list of authorized students to enter or exit the bus at the designated stop comprises:
for each of the corresponding list of authorized students, presenting a respective name of the student and a respective user interface element adjacent to the respective name on the display, the respective user interface element being for manually boarding or disembarking the student,
wherein the first input selects the student by selecting the respective second user interface element.

13. The method of claim 11, further comprising:
presenting a cancellation user interface element for cancelling manually boarding or disembarking the selected student,
wherein the cancellation user interface element is positioned adjacent to the confirmation user interface element on the display.

14. The method of claim 11, further comprising:
presenting an indicator on the display to show that the selected student is authorized to enter or exit the bus at the designated stop,
wherein the indicator is positioned adjacent to the photo of the selected student on the display.

15. The method of claim 11, wherein presenting the corresponding list of authorized students to enter or exit the bus at the designated stop comprises:
presenting the corresponding list of authorized students to enter or exit the bus at the designated stop of the multiple stops of the bus route on top of a plurality of students to enter or exit at the multiple stops of the bus route on the display.

16. The method of claim 15, further comprising:
receiving, from the driver, an initial input selecting an initial user interface element for displaying the plurality of students to enter or exit at the multiple stops of the bus route.

17. The method of claim 11, wherein presenting the corresponding list of authorized students to enter or exit the bus at the designated stop comprises:
presenting students who have entered or exited the bus at the designated stop at lower positions in the corresponding list of authorized students presented on the display.

18. A bus computing system of a bus, comprising:
one or more processors; and
one or more computer-readable memories coupled to the one or more processors and having instructions stored thereon that are executable by the one or more processors to perform operations comprising:
receiving, at a designated stop of multiple stops of a bus route of the bus, a student identifier (ID) from a student ID system when a student enters or exits the bus at the designated stop, each stop of the multiple stops of the bus route being associated with a respective list of students to enter or exit the bus;
determining whether the student associated with the student ID is authorized to enter or exit the bus at the designated stop of the multiple stops of the bus route; and in response to determining that the student is not authorized to enter or exit the bus at the designated stop of the multiple stops of the bus route, performing an alert action to alert a driver of the bus;

in response to determining that the student is not authorized to enter or exit the bus at the designated stop, presenting an override user interface element on a display of the bus computing system for overriding a lack of authorization, receiving input from the driver selecting the user interface element, and adding or removing the student ID to or from a roster for the bus to allow the student to enter or exit the bus at the designated stop.

19. The bus computing system of claim 18, wherein the operations further comprise:
   receiving, from the driver of the bus, an input selecting the override user interface element; and
   adding or removing the student ID to or from a roster for the bus, the roster including all students on the bus.

20. The bus computing system of claim 18, wherein the operations further comprise:
   receiving, from the driver, a first input selecting a first user interface element for displaying a plurality of students to enter or exit at the multiple stops of the bus route,
   presenting, on a display of the bus computing system, a corresponding list of authorized students to enter or exit the bus at a second designated stop of the multiple stops of the bus route,
   receiving, from the driver, a second input selecting a second student from the corresponding list of authorized students, the second student having no student ID system and being authorized to enter or exit at the second designated stop,
   presenting a photo of the second student and a second user interface element for confirming manually boarding or disembarking the second student,
   receiving, from the driver, a third input selecting the second user interface element, and
   in response to receiving the third input, adding or removing a second student ID for the second student to or from a roster for the bus, the roster including all students on the bus.

\* \* \* \* \*